United States Patent
Nomura et al.

(10) Patent No.: US 10,731,062 B2
(45) Date of Patent: Aug. 4, 2020

(54) GAS-GENERATING MATERIAL AND MICROPUMP

(71) Applicant: SEKISUI CHEMICAL CO., LTD., Osaka, Osaka (JP)

(72) Inventors: Shigeru Nomura, Osaka (JP); Yoshinori Akagi, Osaka (JP); Shuichiro Matsumoto, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 899 days.

(21) Appl. No.: 14/428,627

(22) PCT Filed: Aug. 30, 2013

(86) PCT No.: PCT/JP2013/073276
§ 371 (c)(1),
(2) Date: Mar. 16, 2015

(87) PCT Pub. No.: WO2014/061355
PCT Pub. Date: Apr. 24, 2014

(65) Prior Publication Data
US 2015/0232714 A1 Aug. 20, 2015

(30) Foreign Application Priority Data

Oct. 15, 2012 (JP) .................. 2012-228175
Mar. 18, 2013 (JP) .................. 2013-055045

(51) Int. Cl.
| | | |
|---|---|---|
| C09J 133/08 | (2006.01) | |
| F04B 19/00 | (2006.01) | |
| C06D 5/04 | (2006.01) | |
| C06B 45/10 | (2006.01) | |
| B01L 5/02 | (2006.01) | |
| C09J 11/06 | (2006.01) | |
| C08K 5/23 | (2006.01) | |
| C08K 5/28 | (2006.01) | |

(52) U.S. Cl.
CPC .............. *C09J 133/08* (2013.01); *B01L 5/02* (2013.01); *C06B 45/10* (2013.01); *C06D 5/04* (2013.01); *C09J 11/06* (2013.01); *F04B 19/006* (2013.01); *C08K 5/23* (2013.01); *C08K 5/28* (2013.01)

(58) Field of Classification Search
CPC ................. C06B 45/10; C09J 133/08
See application file for complete search history.

(56) References Cited

U.S. PATENT DOCUMENTS

| | | | | |
|---|---|---|---|---|
| 2003/0097953 A1* | 5/2003 | Serizawa | .............. | C06B 31/10 102/531 |
| 2003/0145923 A1 | 8/2003 | Redecker et al. | | |
| 2004/0000362 A1 | 1/2004 | Sato et al. | | |
| 2007/0163457 A1* | 7/2007 | Matsumura | ............. | F42B 3/103 102/202.7 |
| 2009/0126516 A1 | 5/2009 | Yamamoto et al. | | |
| 2009/0247651 A1 | 10/2009 | Kapiamba et al. | | |
| 2011/0014096 A1* | 1/2011 | Fukuoka | ............. | B01L 3/50273 422/503 |
| 2011/0044863 A1 | 2/2011 | Fukuoka et al. | | |
| 2011/0129392 A1 | 6/2011 | Yamamoto et al. | | |
| 2011/0168306 A1* | 7/2011 | Hollands | ............. | C06B 21/0058 149/19.2 |
| 2014/0134075 A1 | 5/2014 | Fukuoka et al. | | |
| 2014/0161687 A1 | 6/2014 | Akagi et al. | | |

FOREIGN PATENT DOCUMENTS

| | | |
|---|---|---|
| CN | 101400432 A | 4/2009 |
| CN | 101970098 A | 2/2011 |
| CN | 102146905 A | 8/2011 |
| CN | 103717553 A | 4/2014 |
| EP | 2 256 349 A1 | 12/2010 |
| JP | WO0166494 * | 12/2001 |
| JP | 2002-187790 A | 7/2002 |
| JP | 2005-197630 A | 7/2005 |
| JP | 2005-231907 A | 9/2005 |
| JP | 2006-128621 A | 5/2006 |
| JP | 2009-247896 A | 10/2009 |
| JP | 2010-89259 A | 4/2010 |
| JP | 2012-72007 A | 4/2012 |
| JP | 2012-184119 A | 9/2012 |
| JP | 5162731 B1 | 12/2012 |
| WO | WO-98/37040 A1 | 8/1998 |
| WO | WO-2013/183175 A1 | 12/2013 |

OTHER PUBLICATIONS

International Search Report for the Application No. PCT/JP2013/073276 dated Feb. 4, 2014.
Written Opinion of the International Searching Authority (PCT/ISA/237) for Application No. PCT/JP2013/073276 dated Feb. 4, 2014.
The Second Office Action for the Application No. 201380030332.8 from the State Intellectual Property Office of the People's Republic of China dated Oct. 14, 2016.
The First Office Action for the Application No. 201380030332.8 from the State Intellectual Property Office of the People's Republic of China dated Feb. 15, 2016.

(Continued)

*Primary Examiner* — Aileen B Felton
(74) *Attorney, Agent, or Firm* — Cheng Law Group, PLLC

(57) ABSTRACT

Provided is a gas-generating material which exhibits a high adhesive property to a member to be adhered and which makes it possible to generate a gas in a large amount per unit time even when the gas-generating material contains a silane coupling agent. The gas-generating material according to the present invention contains: a binder resin; a gas-generating agent which is an azo compound or an azide compound; and a silane coupling agent having an amino group.

14 Claims, 4 Drawing Sheets

(56) References Cited

OTHER PUBLICATIONS

Supplementary European Search Report for the Application No. EP 13 84 6906 dated Jun. 29, 2016.
Written Opinion of the International Searching Authority (PCT/ISA/237) for Application No. PCT/JP2013/073276 dated Feb. 4, 2014 (English Translation mailed Apr. 30, 2015).

* cited by examiner

[FIG. 1]
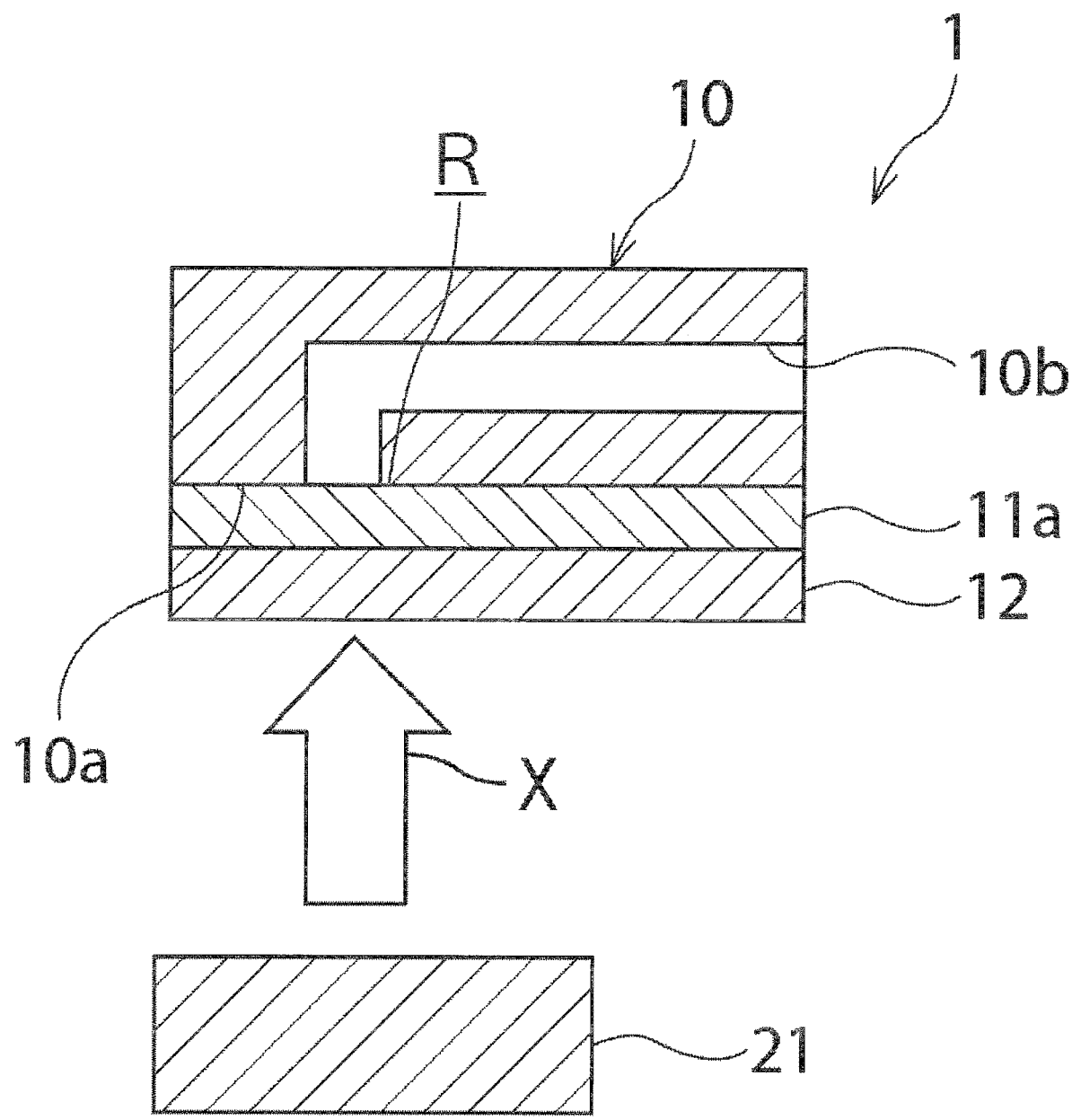

[FIG. 2]
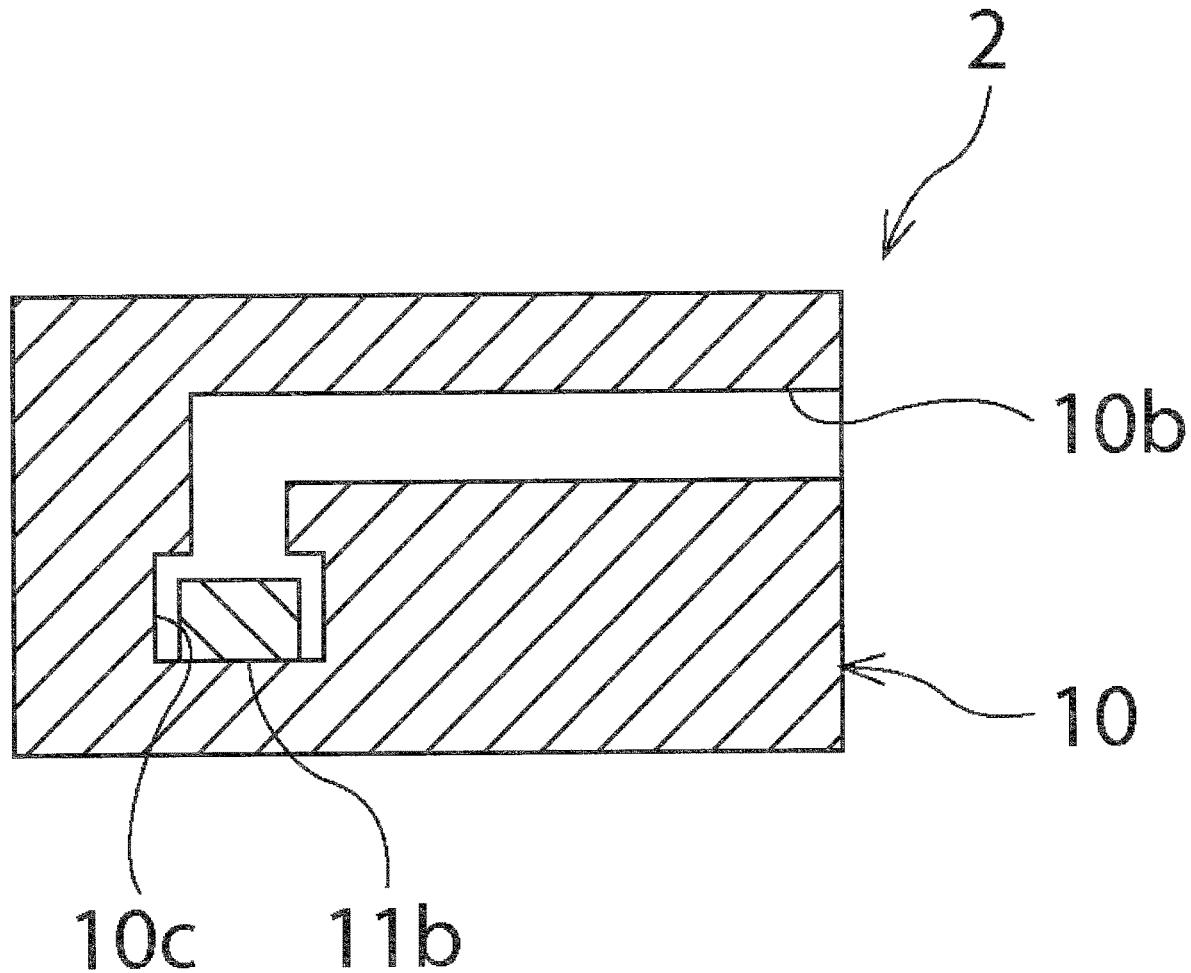

[FIG. 3]
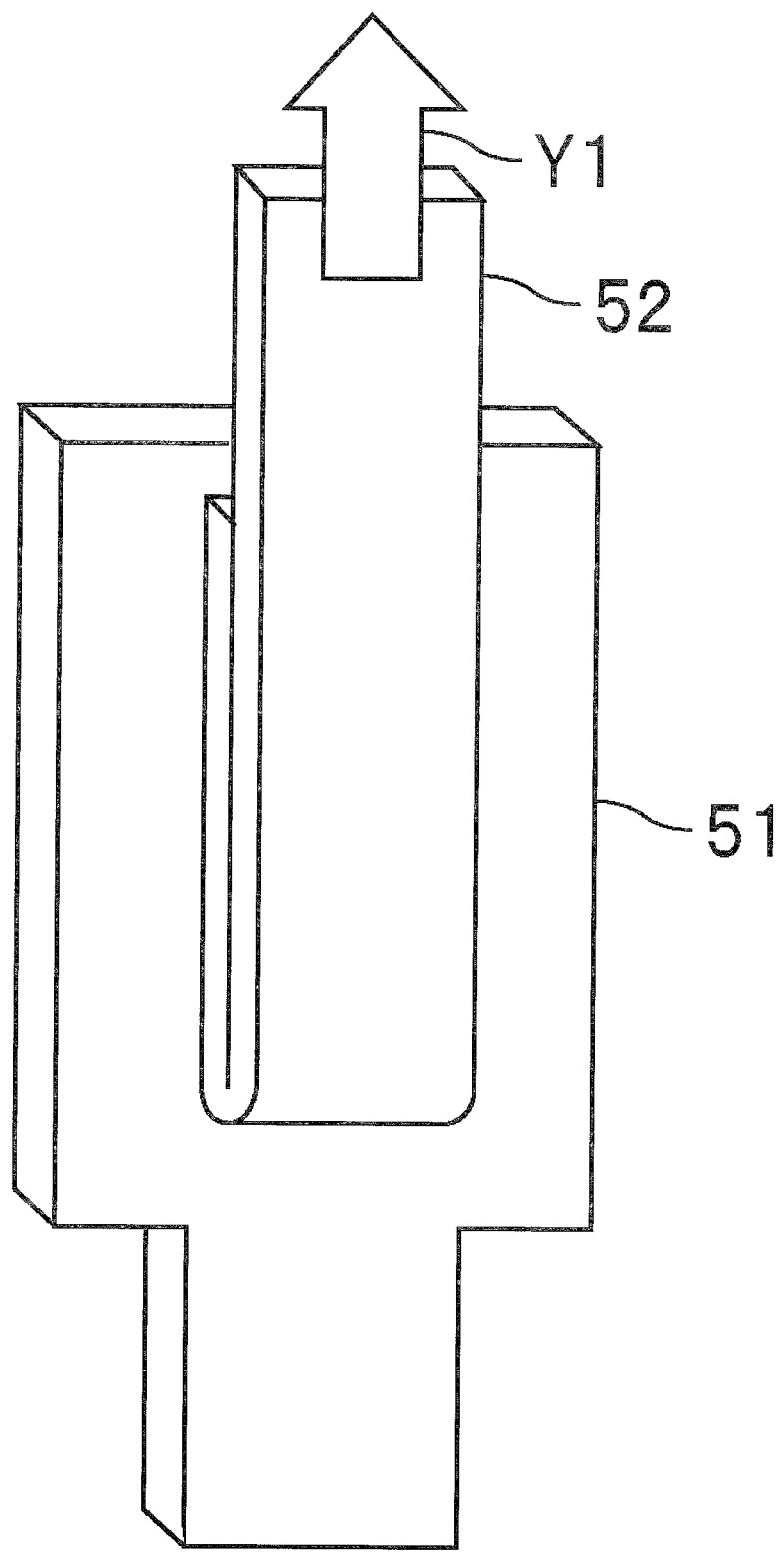

[FIG. 4]
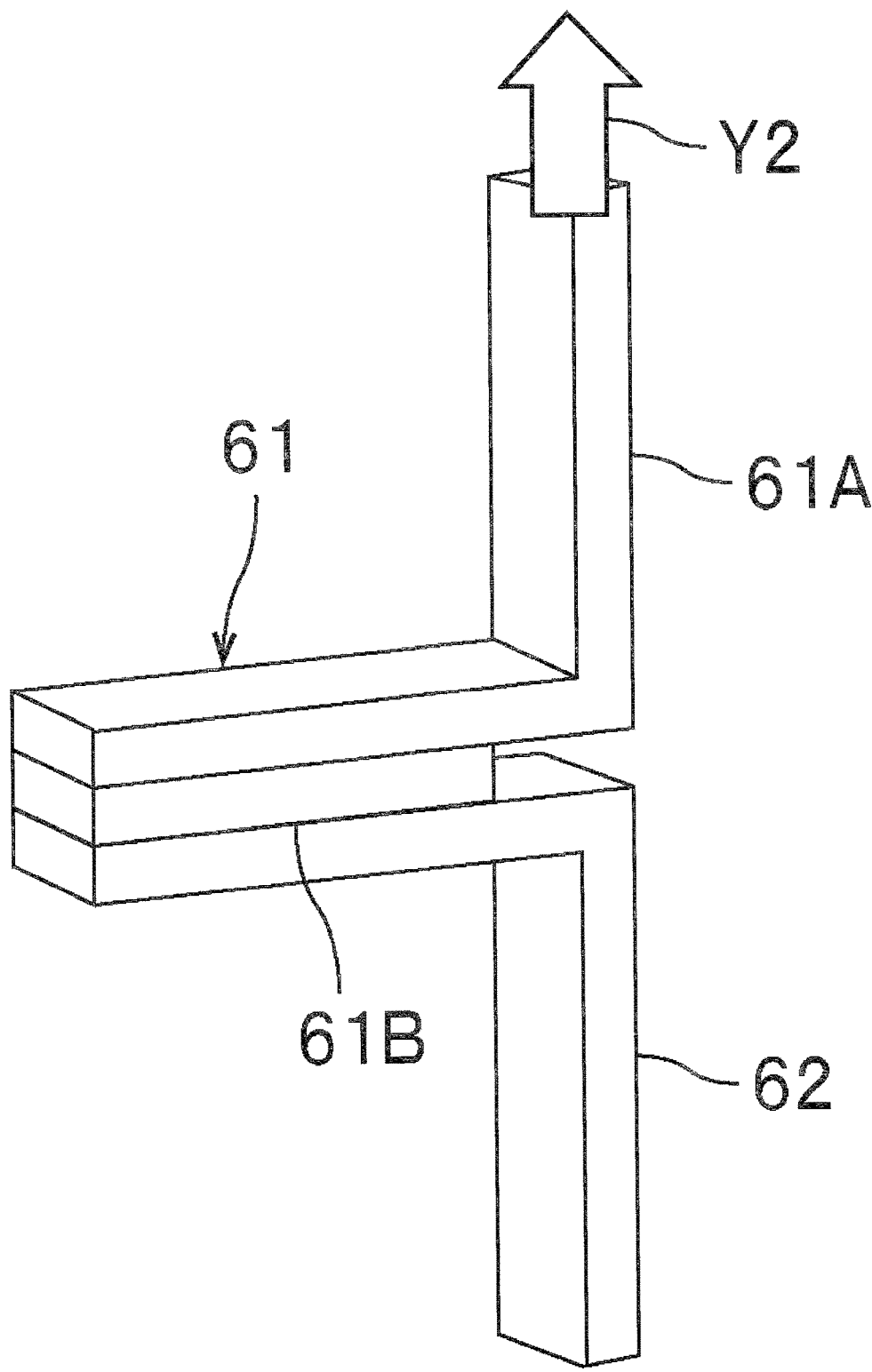

GAS-GENERATING MATERIAL AND MICROPUMP

TECHNICAL FIELD

The present invention relates to a gas-generating material and a micropump provided with the gas-generating material.

BACKGROUND ART

In recent years, analysis apparatuses each equipped with a microfluidic device have been used as analysis apparatuses having small sizes and excellent portability. In the analysis apparatuses each equipped with a microfluidic device, the sending, dilution, concentration, analysis and so on of a sample can be carried out in a micro flow path.

In the microfluidic device, a micropump is provided for the purpose of sending a sample or the like in the micro flow path. For example, Patent Document 1 shown below discloses a micropump produced using a light-responsive gas-generating material (adhesive agent composition) containing a photoacid generator and an acid-induced gas generator. Patent Document 1 also discloses a light-responsive gas-generating material which is produced by blending a binder resin (an acrylic pressure-sensitive adhesive agent) such as a methyl methacrylate-acrylamide copolymer with a photoacid generator and an acid-induced gas generator. In Patent Document 1, a carbonate and a bicarbonate are mentioned as examples of the acid-induced gas generator.

Patent Documents 2 and 3 do not disclose any use application of a micropump, but disclose compositions each containing a gas-generating agent.

In Patent Document 2, it is described that the surface of a glass plate having, attached thereto, a layer containing a gas-generating agent is treated with a silane coupling agent. In Patent Document 2, the silane coupling agent is not contained in the layer containing the gas-generating agent.

Patent Document 3 discloses a multilayer sheet which comprises a layer containing a gas-generating agent and a layer containing an amino-type silane coupling agent. In Patent Document 3, the layers in the multilayer sheet are formed using different compositions from each other and the gas-generating agent and the amino-type silane coupling agent are used separately in different layers.

In Patent Document 4 shown below, although use applications of a micropump are not disclosed, an adhesive agent composition containing a first component (a polymer) having a plurality of alkyne groups and a second component (a polymer) having a plurality of azide groups is disclosed. The cross-linking between the first component and the second component proceeds through a Click reaction.

PRIOR ART DOCUMENT

Patent Document

Patent Document 1: JP 2010-89259 A
Patent Document 2: JP 2005-197630 A
Patent Document 3: JP 2006-128621 A
Patent Document 4: JP 2009-247896 A

SUMMARY OF THE INVENTION

Problems to be Solved by the Invention

When a gas-generating agent is added to a binder resin to produce a gas-generating material, an adhesive property of the gas-generating material to a member to be adhered is sometimes deteriorated. Furthermore, it is desired that the gas-generating material can generate a gas in a larger amount.

An object of the present invention is to provide a gas-generating material which exhibits a high adhesive property to a member to be adhered, and which makes it possible to generate a gas in a large amount per unit time even when the gas-generating material contains a silane coupling agent. The present invention also provides a micropump equipped with the gas-generating material.

Means for Solving the Problems

According to a broad aspect of the present invention, a gas-generating material is provided, which contains: a binder resin; a gas-generating agent which is an azo compound or an azide compound; and a silane coupling agent having an amino group.

In a specific aspect of the gas-generating material according to the present invention, the azide compound has a sulfonylazide group or an azidomethyl group.

In a specific aspect of the gas-generating material according to the present invention, the gas-generating material additionally contains a photosensitizer.

In a specific aspect of the gas-generating material according to the present invention, the photosensitizer contains at least one compound selected from the group consisting of a thioxanthone compound, a phenothiazine compound, an anthracene compound and an acridone compound.

In a specific aspect of the gas-generating material according to the present invention, the content of the silane coupling agent having an amino group is 0.0001 parts by mass or more and 1 part by mass or less relative to 100 parts by mass of the gas-generating agent.

In a specific aspect of the gas-generating material according to the present invention, the gas-generating agent is an azide compound, the azide compound is produced by blending an azide compound having a plurality of azide groups with a polymer having a carbon-carbon double bond, and the gas-generating material contains an acrylic pressure-sensitive adhesive agent as the binder resin.

In a specific aspect of the gas-generating material according to the present invention, the polymer having a carbon-carbon double bond has at least one of a vinyl group and a (meth)acryloyl group as a group containing a carbon-carbon double bond.

In a specific aspect of the gas-generating material according to the present invention, the polymer having a carbon-carbon double bond has both a vinyl group and a (meth)acryloyl group as groups each containing a carbon-carbon double bond.

In a specific aspect of the gas-generating material according to the present invention, the polymer having a carbon-carbon double bond has a plurality of carbon-carbon double bonds.

In a specific aspect of the gas-generating material according to the present invention, the gas-generating material is a gas-generating material which is used in a micropump.

According to a broad aspect of the present invention, a micropump is provided, which is equipped with the gas-generating material as mentioned above and a base having a micro flow path formed therein, and the gas-generating material being so arranged that a gas generated in the gas-generating material is supplied to the micro flow path.

Effect of the Invention

The gas-generating material according to the present invention contains a binder resin, a gas-generating agent which is an azo compound or an azide compound, and a silane coupling agent having an amino group, and therefore makes it possible to have an improved adhesive property to a member to be adhered. Furthermore, the amount of a gas generated by the gas-generating material according to the present invention per unit time makes it possible to be increased in spite of the fact that the gas-generating material contains the silane coupling agent.

BRIEF DESCRIPTION OF DRAWINGS

FIG. 1 is a schematic cross-sectional view of a micropump according to a first embodiment of the present invention.

FIG. 2 is a schematic cross-sectional view of a micropump according to a second embodiment of the present invention.

FIG. 3 is a schematic view for explaining the method for measuring adhesion force in Examples and the like.

FIG. 4 is a schematic view for explaining the method for measuring anchoring force in Examples and the like.

MODE(S) FOR CARRYING OUT THE INVENTION

The present invention will be described in detail hereinbelow.

The gas-generating material according to the present invention contains a binder resin, a gas-generating agent which is an azo compound or an azide compound, and a silane coupling agent having an amino group.

The gas-generating material according to the present invention has the above-mentioned composition, and therefore the adhesive property of the gas-generating material to a member to be adhered makes it possible to be improved. Furthermore, in the gas-generating material according to the present invention, the amount of a gas generated per unit time makes it possible to be increased in spite of the fact that the gas-generating material contains a silane coupling agent.

When a conventional adhesive agent composition is adhered onto a member to be adhered such as a base, the initial adhesion force and the initial anchoring force of the adhesive agent composition to the member to be adhered are sometimes poor.

On the other hand, when a conventional gas-generating material (an adhesive agent composition) containing a gas-generating agent is adhered onto a member to be adhered, the adhesion force and the anchoring force of the gas-generating material to the member to be adhered are sometimes poor upon the generation of a gas from the gas-generating agent. Particularly, with respect to a conventional gas-generating material containing a gas-generating agent, a gas generated from the gas-generating agent can be easily released excessively from the gas-generating agent and, consequently, the decrease in the adhesion force and the anchoring force of the gas-generating material to a member to be adhered may cause a significant problem. If the adhesion force and the anchoring force of the gas-generating material to a member to be adhered are decreased, the gas-generating material can be detached from the member to be adhered easily.

In contrast, when an adhesive agent composition that does not contain a gas-generating agent is adhered onto a member to be adhered such as a substrate, the adhesion force and the anchoring force of the adhesive agent composition to the member to be adhered are not decreased to a large extent during use. That is, although the decrease in the adhesion force and the anchoring force is not a problem during use when a gas-generating agent is not used, the decrease in the adhesion force and the anchoring force may become a major problem under the influence of the generation of a gas during use when a gas-generating agent is used.

The present inventors found that, in a micropump, when a conventional gas-generating material (an adhesive agent composition) containing a gas-generating agent is adhered onto a member to be adhered, the initial adhesion force and the initial anchoring force are low, or a gas generated from the gas-generating agent tends to move toward or be accumulated in an unintended area, and the gas cannot be supplied to a micro flow path sufficiently. In addition, the present inventors also found that it is necessary to increase the initial adhesion force and the initial anchoring force of a gas-generating material to a member to be adhered for the purpose of supplying a gas to a micro flow path sufficiently.

In addition, the present inventors also found that, when a conventional gas-generating material containing a gas-generating agent is adhered onto a member to be adhered, even if the initial adhesion force and the initial anchoring force are high, the adhesion force and the anchoring force are greatly decreased and the gas-generating material may be detached from the member to be adhered easily upon the generation of a gas in the gas-generating material. It is considered that the cause of this phenomenon is such a matter that a gas generated from the gas-generating agent moves toward or is accumulated in an unintended area such as an adhesion interface between the gas-generating material and the member to be adhered.

On the basis of these new findings, the present inventors found that the constitution for preventing the decrease in the adhesion force and the anchoring force upon the generation of a gas in a gas-generating material and therefore preventing the gas-generating material from being detached from the member to be adhered easily is as follows: the gas-generating agent is an azide compound, the azide compound is produced by blending an azide compound having a plurality of azide groups with a polymer having a carbon-carbon double bond, and the gas-generating material preferably contains an acrylic pressure-sensitive adhesive agent as the binder resin.

That is, the gas-generating material according to the present invention preferably contains: a gas-generating agent (also referred to as a "gas-generating agent A," hereinbelow) which is produced by blending an azide compound having a plurality of azide groups with a polymer having a carbon-carbon double bond; and an acrylic pressure-sensitive adhesive agent. By employing this constitution, it becomes possible to improve the initial adhesion force and the initial anchoring force when the gas-generating material is adhered onto a member to be adhered. Furthermore, by employing this constitution, a gas generated from the gas-generating agent can be released at a proper rate. As a result, the adhesion force and the anchoring force are hardly decreased even when a gas is generated in the gas-generating material after the adhesion of the gas-generating material onto the member to be adhered. Thus, the detachment of the gas-generating material from the member to be adhered is hardly caused before use and during use.

Hereinafter, the reason why the detachment of the gas-generating material from the member to be adhered is hardly caused will be described concretely taking a micropump as an example.

When the blending amount of a conventional gas-generating agent in the gas-generating material is increased (for example, 50 mass %), or when the gas-generating agent has a liquid form at ambient temperature and therefore has too high fluidity, the adhesion force and the anchoring force of the gas-generating material tend to become insufficient. When an external stimulus such as light is applied to the gas-generating material, the adhesion force and the anchoring force tend to be deteriorated due to a gas generated from the gas-generating agent and, therefore, particularly the retaining force tends to be deteriorated.

Furthermore, in a micropump in which the gas-generating material is attached to a base, a gas generated upon the application of an external stimulus such as light to the gas-generating material moves from a micro flow path formed in the base toward a predetermined region. In this manner, the micropump can act as a pump. However, in a micropump, a check valve is provided for the purpose of preventing the backward flow of a gas in the micro flow path, and the micro flow path is so formed as to have an extremely small flow path diameter for the purpose of allowing a smaller amount of a gas to flow with high accuracy. Therefore, the resistance between the micro flow path and a flow path for a liquid pushed by the gas becomes large. In a micropump, it is required that the liquid can be pushed by the gas without causing the detachment of the gas-generating material from the base even when the resistance is applied.

Then, it is considered that the detachment of the gas-generating material from the base can be prevented by controlling the cross-linking density or the like in the acrylic pressure-sensitive adhesive agent. However, it is difficult to prevent the detachment of the gas-generating material from the base sufficiently merely by controlling the cross-linking density in the acrylic pressure-sensitive adhesive agent.

In contrast, the present inventors found that the detachment of the gas-generating material from the base can be prevented using the specific gas-generating agent A as mentioned above. When a gas-generating material containing the specific gas-generating agent A is used, a liquid can be pushed by a gas satisfactorily without causing the detachment of the gas-generating material from the base even when a resistance is applied in the micropump.

When an azide compound having a plurality of azide groups is blended with a polymer having a carbon-carbon double bond, the reaction of an azide group with a carbon-carbon double bond can proceed even at room temperature. Across-linking reaction can proceed by reacting a carbon-carbon double bond in the polymer having a carbon-carbon double bond with some of the azide groups in the azide compound having a plurality of azide groups. Thus, adhesion force and anchoring force can be increased in the gas-generating material containing the gas-generating agent A. Consequently, the leakage of the gas to an undesired region can be prevented and the gas can move toward a predetermined part through a micro flow path formed in a base.

In the gas-generating agent A, it is preferred that the azide compound having a plurality of azide groups is reacted with the polymer having a carbon-carbon double bond. In the gas-generating agent A, it is preferred that some of the azide groups in the azide compound are reacted with the carbon-carbon double bond in the polymer. The gas-generating agent A has azide groups for the purpose of generating the gas from the whole body of the gas-generating agent A.

For the purpose of producing the gas-generating material containing the gas-generating agent A, the following steps may be carried out: a step of blending the azide compound having a plurality of azide groups with the polymer having a carbon-carbon double bond to produce the gas-generating agent A; and a step of blending the resultant gas-generating agent A with the acrylic pressure-sensitive adhesive agent. For the purpose of producing a gas-generating material containing the gas-generating agent A, at least one of the azide compound having a plurality of azide groups and the polymer having a carbon-carbon double bond may be blended with the acrylic pressure-sensitive adhesive agent. For example, a step of blending the azide compound having a plurality of azide groups and the polymer having a carbon-carbon double bond with the acrylic pressure-sensitive adhesive agent to produce the gas-generating agent A in the acrylic pressure-sensitive adhesive agent may be carried out.

From the viewpoint of the efficient reaction of the azide compound having a plurality of azide groups with the polymer having a carbon-carbon double bond and the further prevention of the detachment of the gas-generating material from an object to be adhered, it is preferred to blend the azide compound having a plurality of azide groups with the polymer having a carbon-carbon double bond to produce the gas-generating agent A and then blend the gas-generating agent A with the acrylic pressure-sensitive adhesive agent.

The gel fraction of the gas-generating agent is preferably 30 mass % or more and preferably 100 mass % or less. The swelling degree of the gas-generating agent is preferably 110% or more and preferably 500% or less. The gel fraction and the swelling degree can be respectively determined by the methods described in the evaluation sections in Examples described below.

The gas-generating material preferably contains a tertiary amine. The gas-generating material preferably contains a photosensitizer. The gas-generating material preferably contains a tackifier.

When the tertiary amine and the photosensitizer are contained in the gas-generating material, the generation of a nitrogen gas can be achieved smoothly and the amount of the generated gas can be increased.

Hereinafter, one example of preferred embodiments of the present invention is described. However, the embodiment mentioned below is merely illustrative. The present invention is not limited to the below-mentioned embodiment in any way.

The drawings which are referred to in this embodiment are illustrated schematically, in which the ratios of sizes and so on of an object illustrated in the drawings may sometimes be different from those of an actual one. However, specific ratios of sizes and so on of the object should be considered with taking the statements mentioned below into consideration.

FIG. 1 is a schematic cross-sectional view of a micropump according to a first embodiment of the present invention. A micropump 1 illustrated in FIG. 1 is equipped with a plate-like base 10. Examples of the material that constitutes the base 10 include resin, glass and ceramic materials. Examples of the resin that constitutes the base 10 include an organosiloxane compound, a polymethacrylate resin and a polyolefin resin. An example of the polyolefin resin is a cyclic polyolefin resin. Specific examples of the organosiloxane compound include polydimethylsiloxane (PDMS) and polymethylhydrosiloxane.

In the base 10, a micro flow path 10*b* which is opened to the main surface 10*a* of the base 10 is formed.

The term "micro flow path" refers to a flow path which is formed in such a shape/size that a liquid flowing through the micro flow path can exhibit a so-called "micro effect." Specifically, the "micro flow path" refers to a flow path which is formed in such a shape/size that a liquid flowing through the micro flow path can be strongly affected by surface tension and capillarity and consequently can exhibit a different behavior from the behavior of a liquid that flows through a flow path having an ordinary size.

Onto the main surface 10a, a film-like gas-generating material 11a is attached. The gas-generating material 11a is a gas-generating material for a micropump. The opening of the micro flow path 10b is covered with the gas-generating material 11a. Therefore, a gas generated from the gas-generating material 11a upon the application of an external stimulus such as light or heat to the gas-generating material 11a is guided toward the micro flow path 10b.

The thickness of the gas-generating material 11a is not limited particularly. The thickness of the gas-generating material 11a is preferably 5 µm or more, more preferably 10 µm or more, and preferably 5 mm or less, more preferably 500 µm or less.

The gas-generating material 11a is covered with a gas barrier layer 12. The gas barrier layer 12 can prevent the outflow of a gas generated in the gas-generating material 11a into the opposite side of the main surface 10a, and enables the efficient supply of the gas into the micro flow path 10b. Therefore, the gas barrier layer 12 is preferably a layer having a low permeability for the gas generated in the gas-generating material 11a.

Examples of the material that constitutes the gas barrier layer 12 include a polyacrylic resin, a polyolefin resin, a polycarbonate resin, a vinyl chloride resin, an ABS resin, a polyethylene terephthalate (PET) resin, a nylon resin, a urethane resin, a polyimide resin and glass.

The thickness of the gas barrier layer 12 can be varied properly depending on the types of the material of the gas barrier layer 12 and the like, and is not particularly limited. The thickness of the gas barrier layer 12 is preferably 10 µm or more, more preferably 25 µm or more, and preferably 1 mm or less, more preferably 100 µm or less. When it is intended to transmit light, the gas barrier layer 12 is preferably a layer through which the attenuation of light falling within an ultraviolet ray range hardly occurs.

The gas-generating material 11a is preferably a film. The type of the film includes a tape and a sheet.

The gas-generating material 11a contains a binder resin, a gas-generating agent which is an azo compound or an azide compound, and a silane coupling agent having an amino group.

In the micropump 1, for the purpose of generating a gas from the gas-generating material 11a by the irradiation with light, the following procedure is carried out, for example: light is emitted in the direction indicated by the arrow X from a light irradiation device 21 toward the gas-generating material 11a. Since the gas-generating material 11a contains a binder resin, a gas-generating agent which is an azo compound or an azide compound, and a silane coupling agent having an amino group, it is difficult for a gas generated from the gas-generating agent to move toward or be retained in a region R that is an adhesion interface between the gas-generating material 11a and the base 10 that is a member to be adhered, whereby the decrease in adhesion force and anchoring force can be prevented. In addition, since the gas-generating material 11a has excellent transparency, light that reaches the gas-generating material 11a can transmit through the inside of the gas-generating material 11a with high efficiency.

When the gas-generating agent contained in the gas-generating material 11a is an azide compound, the azide compound is produced by blending an azide compound having a plurality of azide groups with a polymer having a carbon-carbon double bond, and the gas-generating material 11a contains an acrylic pressure-sensitive adhesive agent as the binder resin, it is more difficult for a gas generated from the gas-generating agent A to move toward or be retained in the region R that is an adhesion interface between the gas-generating material 11a and the base 10 that is a member to be adhered, whereby the decrease in adhesion force and anchoring force can be prevented more effectively. In addition, since the gas-generating material 11a containing the gas-generating agent A has excellent transparency, light that reaches the gas-generating material 11a can transmit through the inside of the gas-generating material 11a with high efficiency.

Hereinbelow, the components to be used in the gas-generating material will be described in detail.

(Binder Resin)

The gas-generating material contains the binder resin. The gas-generating material preferably contains an acrylic pressure-sensitive adhesive agent as the binder resin. When the gas-generating material contains the acrylic pressure-sensitive adhesive agent, the gas-generating material can be adhered onto a member to be adhered, such as a base, more satisfactorily. Since the gas-generating material contains a binder resin, the gas-generating material can be made into the form of a tablet, a microparticle, a film and the like easily. When the gas-generating material has the form of a tablet, a microparticle, a film or the like, the gas-generating material can be adhered to a member to be adhered easily and the gas-generating agent can also be retained in the gas-generating material tightly. Only one type of the binder resin may used, or two or more types of the binder resins may also be used in combination.

The binder resin is not limited particularly. As the binder resin, a proper binder resin can be used, which enables the gas-generating agent and the silane coupling agent having an amino group to be retained in the gas-generating material. As the binder resin, a polymeric material such as poly(meth)acrylate, polyester, polyethylene, polypropylene, polystyrene, polyether, polyurethane, polycarbonate, polyamide and polyimide can be used. A copolymer of a monomer that constitutes the polymeric material can also be used, and the polymeric materials can also be used in combination. Among these, the binder resin is preferably the poly(meth)acrylate, since the poly(meth)acrylate enables the further increase in gas generation efficiency. That is, the binder resin is preferably a (meth)acrylic polymer. The (meth)acrylic polymer includes a (meth)acrylic copolymer.

The acrylic pressure-sensitive adhesive agent can be used as the binder resin in the gas-generating material. The acrylic pressure-sensitive adhesive agent preferably has a (meth)acryloyl group. The term "(meth)acryloyl group" means an acryloyl group or a methacryloyl group. Only one type of the acrylic pressure-sensitive adhesive agent may be used, or two or more types of the acrylic pressure-sensitive adhesive agents may also be used in combination.

The acrylic pressure-sensitive adhesive agent is not particularly limited. As the acrylic pressure-sensitive adhesive agent, a proper acrylic pressure-sensitive adhesive agent that enables the gas-generating agent to be retained in the gas-generating material can be used. As the acrylic pressure-sensitive adhesive agent, a polymeric material such as poly(meth)acrylate can be used. A copolymer of a monomer that constitutes the polymeric material can also be used. That is, the acrylic pressure-sensitive adhesive agent is preferably a (meth)acrylic polymer.

The SP value of each of the binder resin and the acrylic pressure-sensitive adhesive agent is preferably 7 or more and preferably 10.5 or less. When the SP value of each of the binder resin and the acrylic pressure-sensitive adhesive agent is equal to or larger than the lower limit and is equal to or smaller than the upper limit, the compatibility of the binder resin with the gas-generating agent and the compatibility of the acrylic pressure-sensitive adhesive agent with the gas-generating agent are further improved.

The SP value (a solubility parameter) can be calculated employing a Fedors method (R. F. Fedors, Polym. Eng. Sci., 14, 147 (1974)).

The (meth)acrylate monomer that constitutes the poly (meth)acrylate may be either of a linear compound and a cyclic compound. Examples of the linear compound include methyl (meth)acrylate, ethyl acrylate, butyl (meth)acrylate, 2-methylhexyl (meth)acrylate and lauryl (meth)acrylate. Examples of the cyclic compound include cyclohexyl (meth) acrylate and isobornyl (meth)acrylate. Among these, methyl (meth)acrylate is preferred.

The poly(meth)acrylate may be, for example, a copolymer of a (meth)acrylate monomer and a vinyl monomer that is copolymerizable with the (meth)acrylate monomer. The vinyl monomer is not particularly limited, and examples of the vinyl monomer include: a vinyl monomer containing a carboxyl group, such as (meth)acrylic acid, itaconic acid, crotonic acid, maleic acid (anhydride), fumaric acid (anhydride) and carboxyalkyl (meth)acrylates (e.g., carboxyethyl acrylate); a vinyl monomer containing a hydroxyl group, such as 2-hydroxyethyl (meth)acrylate, 2-hydroxypropyl (meth)acrylate, 4-hydroxybutyl (meth)acrylate, caprolactone-modified (meth)acrylate and polyethylene glycol (meth)acrylate; and a nitrogen-containing vinyl monomer, such as (meth)acrylonitrile, N-vinylpyrrolidone, N-vinylcaprolactam, N-vinyl laurilolactam, (meth)acryloylmorpholine, (meth)acrylamide, dimethyl(meth)acrylamide, N-methylol(meth)acrylamide, N-butoxymethyl(meth)acrylamide, N-isopropyl(meth)acrylamide and dimethylaminomethyl(meth)acrylate. Only one type of the vinyl monomer may be used, or two or more types of the vinyl monomers may also be used in combination.

The combination of the (meth)acrylate monomer and the vinyl monomer is not particularly limited, and a combination of butyl (meth)acrylate and (meth)acrylic acid, a combination of butyl (meth)acrylate and (meth)acrylamide, a combination of (meth)acrylic acid and N-isopropyl(meth) acrylamide and the like can be mentioned. The copolymerization ratio (by mass) of the (meth)acrylate monomer to the vinyl monomer preferably falls within the range from 98:2 to 51:49.

For the purpose of further increasing the gas generation efficiency, it is preferred that the poly(meth)acrylate contains at least one compound selected from the group consisting of polymethyl (meth)acrylate, a butyl (meth)acrylate-(meth) acrylic acid copolymer and a butyl (meth)acrylate-(meth) acrylamide copolymer. For the purpose of still further increasing the gas generation efficiency, it is preferred that the poly(meth)acrylate has an amino group or a carbonyl group.

The binder resin preferably has an ultraviolet ray absorption band. The wavelength of the ultraviolet ray absorption band of the binder resin is preferably shorter than those of the gas-generating agent and the photosensitizer.

The weight average molecular weight of each of the binder resin and the acrylic pressure-sensitive adhesive agent is preferably 50,000 or more, more preferably 600,000 or more, and preferably 2,000,000 or less, more preferably 1,600,000 or less. When the weight average molecular weight of each of the binder resin and the acrylic pressure-sensitive adhesive agent is equal to or larger than the lower limit, the deterioration in the cohesive force of the binder resin itself can be prevented, the gas-generating agent and the silane coupling agent having an amino group can be retained in the gas-generating material tightly, and the tackifier can also be retained in the gas-generating material tightly. When the weight average molecular weight of each of the binder resin and the acrylic pressure-sensitive adhesive agent is equal to or smaller than the upper limit, the gas-generating material can be processed into various forms easily.

The acrylic pressure-sensitive adhesive agent has an adhesive property. Each of the binder resin and the acrylic pressure-sensitive adhesive agent preferably has an adhesive/cohesive property. Due to the adhesive/cohesive property of the binder resin and the acrylic pressure-sensitive adhesive agent, the gas-generating material can be imparted with an adhesive/cohesive property. Thus, the gas-generating material can be arranged in the micropump easily. For example, a film-like gas-generating material having an adhesive/cohesive property can be attached onto the surface of a substrate of the micropump or the wall surface in the substrate easily.

The content of each of the binder resin and the acrylic pressure-sensitive adhesive agent is preferably 10 parts by mass or more, more preferably 20 parts by mass or more, still more preferably 30 parts by mass or more, and preferably 300 parts by mass or less, more preferably 200 parts by mass or less, still more preferably 150 parts by mass or less relative to 100 parts by mass of the gas-generating agent.

(Gas-Generating Agent)

The gas-generating material contains the gas-generating agent. The gas-generating agent is an azo compound or an azide compound. The gas-generating agent enables the generation of a gas upon the application of an external stimulus such as heat or light. The azo compound or the azide compound is not particularly limited, and may be any known azo compound or any known azide compound. The gas-generating agent is preferably the azo compound, and is also preferably the azide compound. Only one type of the gas-generating agent may be used, or two or more types of the gas-generating agents may also be used in combination.

Specific examples of the azo compound to be used as the gas-generating agent include 2,2'-azobis(N-cyclohexyl-2-methylpropionamide), 2,2'-azobis[N-(2-methylpropyl)-2-methylpropionamide], 2,2'-azobis(N-butyl-2-methylpropionamide), 2,2'-azobis[N-(2-methylethyl)-2-methylpropionamide], 2,2'-azobis(N-hexyl-2-methylpropionamide), 2,2'-azobis(N-propyl-2-methylpropionamide), 2,2'-azobis(N-ethyl-2-methylpropionamide), 2,2'-azobis{2-methyl-N-[1,1-bis(hydroxymethyl)-2-hydroxyeth yl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis[2-(5-methyl-2-imidazoylin-2-yl)propane]dihydrochloride, 2,2'-azobis[2-(2-imidazoylin-2-yl)propane]dihydrochloride, 2,2'-azobis[2-(2-imidazoylin-2-yl)propane] disulfatedihydrate, 2,2'-azobis[2-(3,4,5,6-tetrahydropyrimidin-2-yl)propane]dihydrochloride, 2,2'-azobis{2-[1-(2-hydroxyethyl)-2-imidazoylin-2-yl]propan e}dihydrochloride, 2,2'-azobis[2-(2-imidazoylin-2-yl)propane], 2,2'-azobis(2-methylpropionamidine) hydrochloride, 2,2'-azobis(2-aminopropane)dihydrochloride, 2,2'-azobis [N-(2-carboxyacyl)-2-methyl-propionamidine], 2,2'-azobis{2-[N-(2-carboxyethyl)amidine]propane}, 2,2'-azobis(2-methylpropionamidoxime), dimethyl-2,2'-azobis(2- methylpropionate), dimethyl-2,2'-azobisisobutyrate, 4,4'-azobis(4-cyancarbonic acid), 4,4'-azobis(4-cyanopentanoic acid) and 2,2'-azobis(2,4,4-trimethylpentane). Each of these azo compounds can generate a nitrogen gas upon the application of an external stimulus such as light having a wavelength falling within a specific wavelength region or heat.

The azo compound does not generate any gas when subjected to an impact, and is therefore extremely easy to handle. The azo compound does not cause any chain reaction, and therefore does not generate a gas explosively. When the azo compound is used, the generation of a gas can be halted by halting the irradiation with light. Therefore, the control of the amount of a generated gas can be achieved easily using the azo compound as the gas-generating agent.

Examples of the azide compound to be used as the gas-generating agent include azide compounds each having a sulfonylazide group or an azidomethyl group. The azide compound preferably has a sulfonylazide group or an azidomethyl group. The azide compound preferably has a sulfonylazide group, and also preferably has an azidomethyl group.

A preferred example of the compound having a sulfonylazide group is a compound represented by formula (1) shown below.

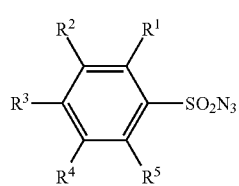

(1)

In formula (1), $R^1$ to $R^5$ independently represent a hydrogen atom, a halogen atom, an amino group, an amide group, a hydrocarbon group, a group having a hydrocarbon group to which a substituent group is bound, or an alkoxy group. $R^1$ to $R^5$ in formula (1) may be the same as and may be different from one another. The hydrocarbon group may be linear, may be branched and may be cyclic. The hydrocarbon group may be a saturated hydrocarbon group and may be an unsaturated hydrocarbon group. The alkoxy group may have a substituent, may be linear and may be branched.

In formula (1), at least one group among $R^1$ to $R^5$ is preferably a hydrocarbon group or a group having a hydrocarbon group to which a substituent group is bound, more preferably a hydrocarbon group. When $R^1$ to $R^5$ independently represent a hydrocarbon group or a group having a hydrocarbon group to which a substituent group is bound, the number of carbon atoms in the hydrocarbon group is 1 or more, preferably 3 or more, more preferably 6 or more, and preferably 30 or less, more preferably 20 or less, still more preferably 18 or less. Examples of the substituent in the hydrocarbon group having the substituent bound thereto include a halogen atom and the like.

In $R^1$ to $R^5$ in formula (1), the number of carbon atoms in the alkoxy group is 1 or more, preferably 3 or more, more preferably 6 or more, and preferably 20 or less, more preferably 16 or less, still more preferably 12 or less. When the alkoxy group has a substituent, examples of the substituent include a halogen atom and the like.

In formula (1), $R^3$ is preferably an amide group, a hydrocarbon group, a group having a hydrocarbon group to which a substituent group is bound, or an alkoxy group. In formula (1), it is preferred that each of $R^1$, $R^2$, $R^4$ and $R^5$ is a hydrogen atom.

As an example of the azide compound having an azidomethyl group, a glycidyl azide polymer can be mentioned. As the glycidyl azide polymer, an aliphatic polyether having an azidomethyl group in a side chain and also having a hydroxyl group at the terminal thereof is preferred.

As a preferred example of the aliphatic polyether having an azidomethyl group in a side chain and also having a hydroxyl group at the terminal thereof, an azide compound represented by formula (2-1) shown below can be mentioned.

In formula (2-1), m+n=2 to 20, m≥1, n≥1, q+r=10 to 35, q≥5, r≥5, A is —OCH$_2$CH$_2$CH$_2$CH$_2$—, —OCH$_2$CH$_2$— or OCH$_2$CH(CH$_3$)—, B is —CH$_2$CH(CH$_2$N$_3$)O—, and $R^1$ is $R^1$ is —CH$_2$CH$_2$—, —CH$_2$CH$_2$CH$_2$CH$_2$—, —CH$_2$CH (CH$_3$)—, —[(CH$_2$CH$_2$O)$_x$CH$_2$CH$_2$]— or [(CH$_2$CH$_2$CH$_2$CH$_2$O)$_y$CH$_2$CH$_2$CH$_2$CH$_2$]—. In $R^1$, x is 10 to 25 and y is 5 to 20.

As another preferred example of the aliphatic polyether having an azidomethyl group in a side chain and also having a hydroxyl group at the terminal thereof, an azide compound represented by formula (2-2) shown below can be mentioned.

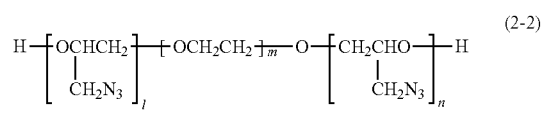

In formula (2-2) shown above, m represents an integer of 1 to 20, l+n is an integer of 7 to 50, m is preferably 3 or more and preferably 15 or less, and l+n is preferably 10 or more and preferably 30 or less.

Still another preferred example of the aliphatic polyether having an azidomethyl group in a side chain and having a hydroxyl group at the terminal is an azide compound represented by formula (2-3) shown below.

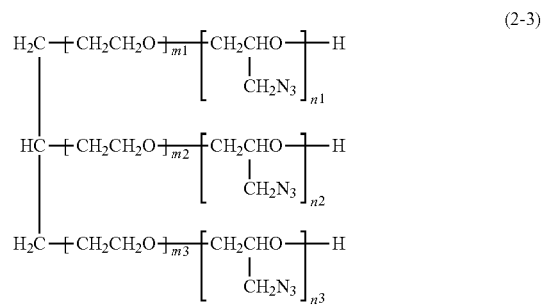

In formula (2-3), m1, m2 and m3 independently represent an integer of 1 to 20, and n1, n2 and n3 independently represent an integer of 1 to 20.

The azide compound is preferably the above-mentioned gas-generating agent A or an azide compound represented by formula (1), (2-1), (2-2) or (2-3) shown above. The azide compound is preferably an azide compound represented by formula (1), (2-1), (2-2) or (2-3) shown above. The azide compound is preferably an azide compound represented by formula (1) shown above, and is also preferably an azide compound represented by formula (2-1), (2-2) or (2-3) shown above.

The above-mentioned azide compound can be decomposed to generate a nitrogen gas upon the application of an external stimulus such as light having a specific wavelength region, heat, an ultrasonic wave or an impact.

For the production of the gas-generating agent A, only one type of the azide compound having a plurality of azide groups may be used, or two or more types of the azide compounds each having a plurality of azide groups may also be used in combination. For the production of the gas-generating agent A, only one type of the polymer having a carbon-carbon double bond may be used, or two or more types of the polymers each having a carbon-carbon double bond may also be used in combination.

From the viewpoint of the further improvement in the reaction efficiency in the production of the gas-generating material, the polymer having a carbon-carbon double bond is preferably a polymer having a plurality of carbon-carbon double bonds, preferably a polymer having a carbon-carbon double bond in a side chain, and more preferably a polymer having a plurality of carbon-carbon double bonds in a side chain. The carbon-carbon double bond in the side chain can react with the azide group with high efficiency. The polymer having a carbon-carbon double bond may have a carbon-carbon double bond both in a side chain and at the terminal thereof.

From the viewpoint of the further improvement in the reaction efficiency in the production of the gas-generating material, the polymer having a carbon-carbon double bond preferably has at least one of a vinyl group and a (meth)acryloyl group as the group containing a carbon-carbon double bond. From the viewpoint of the further improvement in the reaction efficiency in the production of the gas-generating material, the polymer having a carbon-carbon double bond preferably has a plurality of types of groups each containing a carbon-carbon double bond. From the viewpoint of the further improvement in the reaction efficiency in the production of the gas-generating material, the polymer having a carbon-carbon double bond preferably has both a vinyl group and a (meth)acryloyl group as the groups each containing a carbon-carbon double bond.

From the viewpoint of the further improvement in the reaction efficiency in the production of the gas-generating material, the polymer having a carbon-carbon double bond preferably has a (meth)acryloyl group, preferably has a plurality of (meth)acryloyl groups, preferably has a (meth)acryloyl group at the terminal thereof, and preferably has a plurality of (meth)acryloyl groups at the terminal thereof.

From the viewpoint of the further improvement in the reaction efficiency in the production of the gas-generating material, the polymer having a carbon-carbon double bond preferably as a vinyl group, and preferably has a plurality of vinyl groups. The polymer may have a vinyl group at the terminal thereof and may have a vinyl group in a side chain thereof.

The weight average molecular weight of the polymer having a carbon-carbon double bond is preferably 500 or more and preferably 50,000 or less, and more preferably 30,000 or less. The weight average molecular weight refers to a weight average molecular weight in terms of polystyrene as measured by gel permeation chromatography (GPC).

The polymer having a carbon-carbon double bond is preferably a polymer having a plurality of structural units each represented by formula (11) shown below. The polymer having a carbon-carbon double bond preferably has a structural unit represented by formula (11) shown below as a monomer unit.

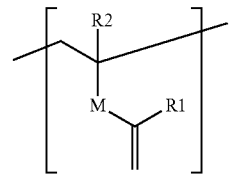

In formula (11), R1 and R2 independently represent a hydrogen atom or a methyl group, M represents a bivalent aliphatic organic group having at least one bond selected from the group consisting of an ether bond, an ester bond, an amide bond and a urethane bond.

In formula (11), R1 and R2 may be the same as and may be different from each other. The aliphatic organic group represented by each of R1 and R2 in formula (11) may be an aliphatic organic group having an aliphatic hydrocarbon group to which a group containing at least one bond selected from the group consisting of an ether bond, an ester bond, an amide bond and a urethane is bound.

The number of carbon atoms in the bivalent aliphatic organic group represented by each of R1 and R2 in formula (11) is preferably 5 or more and preferably 20 or less, and more preferably 10 or less. In formula (11), M is preferably a bivalent aliphatic organic group having at least one bond selected from the group consisting of an ether bond, an ester bond and a urethane bond.

The polymer having a plurality of structural units each represented by formula (11) can be synthesized easily by, for example, a method including reacting a polymer having a plurality of hydroxyl groups with a compound having a group capable of reacting with a hydroxyl group and an unsaturated double bond. As the group capable of reacting with a hydroxyl group, an isocyanate group and the like can be mentioned.

In the polymer having a plurality of structural units each represented by formula (11), the number of the structural units each represented by formula (11) is preferably 5 or more and preferably 500 or less. The number of the structural units each represented by formula (1) may be 300 or less. In the polymer having a plurality of structural units each represented by formula (11), the structural units each represented by formula (11) may be bonded in a random form or may be bonded in a block form.

In formula (11), M is preferably a structural unit represented by formula (12) shown below or a structural unit represented by formula (13) shown below.

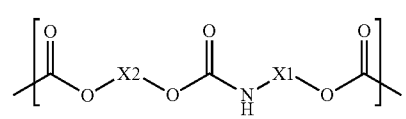

In formula (12), the left side moiety is bound to the upper side moiety in formula (11), the right side moiety is bound to the lower side moiety in formula (11), and X1 and X2 independently represent a bivalent aliphatic organic group having 1 to 8 carbon atoms.

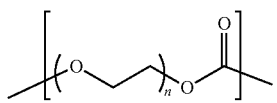

(13)

In formula (13), the left side moiety is bound to the upper side moiety in formula (11), the right side moiety is bound to the lower side moiety in formula (11), and n represents an integer of 1 to 4.

In formula (12), X1 and X2 may be the same as and may be different from each other. In formula (12), the number of carbon atoms in the bivalent aliphatic organic group represented by each of X1 and X2 is preferably 2 or more and preferably 4 or less. In formula (12), the bivalent aliphatic organic group represented by each of X1 and X2 may be a bivalent aliphatic hydrocarbon group and may be a bivalent aliphatic organic group having an aliphatic hydrocarbon group to which a group containing an ether bond is bounded. In formula (12), the bivalent aliphatic organic group represented by each of X1 and X2 is preferably a bivalent aliphatic hydrocarbon group.

In formula (13), n is preferably an integer of 2 or more.

As the azide compound, a glycidyl azide polymer and an azide compound having a sulfonylazide group or an azidomethyl group can be mentioned, for example. The azide compound preferably has a sulfonylazide group or an azidomethyl group. The azide compound preferably has a sulfonylazide group, and also preferably has an azidomethyl group.

The compound having a plurality of azide groups is preferably a compound represented by formula (14) shown below, a compound represented by formula (15) shown below, a compound represented by formula (16) shown below or a compound represented by formula (17) shown below.

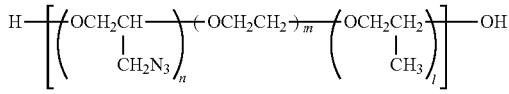

(14)

In formula (14), n represents an integer of 10 to 50, and m+l represents an integer of 1 to 10.

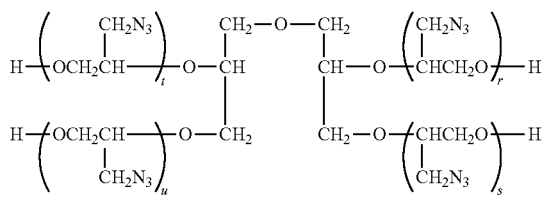

(15)

In formula (15), r+s+t+u represents an integer of 10 to 50.

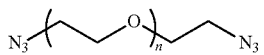

(16)

In formula (16), n represents an integer of 1 to 20.

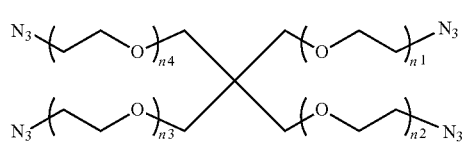

(17)

In formula (17), n1, n2, n3 and n4 independently represent an integer of 1 to 10.

In formula (14), n, m and l may be the same as and may be different from one another.

In formula (15), r, s, t and u may be the same as and may be different from one another. In formula (15), r+s+t+u preferably represents an integer of 15 or more and preferably represents an integer of 30 or less.

In formula (16), n preferably represents an integer of 2 or more, and preferably represents an integer of 8 or less.

In formula (17), n1, n2, n3 and n4 may be the same as and may be different from one another. In formula (17), n1, n2, n3 and n4 preferably independently represent an integer of 3 or more, more preferably independently represent an integer of 4 or more, and preferably independently represent an integer of 8 or less.

In the gas-generating agent A, the azide compound having a plurality of azide groups is preferably added in an amount of 1 part by mass or more, preferably 5 parts by mass or more, preferably 10 parts by mass or more relative to 1 part by mass of the polymer having a carbon-carbon double bond.

In the gas-generating material, the content of the gas-generating agent is preferably 10 mass % or more, more preferably 15 mass % or more, still more preferably 20 mass % or more, and preferably 90 mass % or less, more preferably 75 mass % or less, still more preferably 60 mass % or less.

(Silane Coupling Agent Having an Amino Group)

The gas-generating material contains a silane coupling agent having an amino group. The use of the silane coupling agent having an amino group enables the improvement of the initial adhesion force of the gas-generating material to a member to be adhered, and also enables the prevention of the decrease in the amount of a gas generated from the gas-generating material which is associated with the use of the silane coupling agent. That is, when the silane coupling agent having an amino group is used, the initial adhesion force of the gas-generating material to a member to be adhered can be improved effectively and the decrease in the amount of a gas generated from the gas-generating material can be prevented effectively compared with a case in which a silane coupling agent having no amino group is used. That is, when the silane coupling agent having an amino group is used, the amount of a gas generated per unit time is less affected. This fact is found by the present inventors for the first time. It is preferred that the tertiary amine contains no silicon atom, and it is also preferred that the tertiary amine is not a silane coupling agent. It is preferred that the silane coupling agent having an amino group is not the tertiary amine.

Specific examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N,N'-bis[(3-trimethoxysilyl)propyl]ethylenediamine, 3-aminopropyltrimethoxysilane, 3-aminopropyltriethoxysilane and N-phenyl-3-aminopropyltrimethoxysilane. A silane coupling agent having an amino group other than the above-mentioned compounds may also be used. Only one type of the silane coupling agent having an amino group may be used, or two or more types of the silane coupling agents each having an amino group may also be used in combination.

The use of the silane coupling agent enables the further improvement in the initial adhesion force and the initial anchoring force of the gas-generating material to a member to be adhered. Particularly, the use of the tackifier and the silane coupling agent in combination greatly contributes to the improvement in the initial adhesion force and the initial anchoring force of the gas-generating material to a member to be adhered. Furthermore, the use of the tackifier and the silane coupling agent in combination greatly contributes to the prevention of the decrease in the adhesion force and the anchoring force which is associated with the generation of a gas in the gas-generating material.

Examples of the silane coupling agent having no amino group include: a silane coupling agent having an epoxy group, such as 3-glycidoxypropyltrimethoxysilane, 3-glycidoxypropylmethyldiethoxysilane and 3-glycidoxypropyltriethoxysilane; a silane coupling agent having an isocyanate group, such as 3-isocyanatepropyltriethoxysilane; and a silane coupling agent having a (meth)acryloyl group, such as 3-methacryloxypropyltrimethoxysilane and 3-methacryloxypropylmethyldiethoxysilane.

In the gas-generating material, the content of the silane coupling agent having an amino group is preferably 0.0001 part by mass or more, more preferably 0.0003 part by mass or more, and preferably 1 part by mass or less, more preferably 0.3 part by mass or less relative to 100 parts by mass of the gas-generating agent. When the content of the silane coupling agent having an amino group is equal to or larger than the lower limit, the initial adhesion force and the initial anchoring force of the gas-generating material to a member to be adhered can be further improved. When the content of the silane coupling agent having an amino group is equal to or smaller than the upper limit, the decrease in the amount of a gas generated by the action of an excess amount of the silane coupling agent having an amino group can be prevented more effectively.

(Tertiary Amine)

The gas-generating material preferably contains a tertiary amine. The tertiary amine is not particularly limited. Examples of the tertiary amine include a cyclic amine, a trialkylamine and an aromatic amine. Each of the cyclic amine and the aromatic amine has the structure of a tertiary amine. Only one type of the tertiary amine may be used, or two or more types of the tertiary amines may also be used in combination.

The gas-generating material preferably contains at least one component selected from the group consisting of a cyclic amine, a trialkylamine and an aromatic amine. The tertiary amine is preferably a cyclic amine, is also preferably a trialkylamine, and is also preferably an aromatic amine. The cyclic amine has a cyclic skeleton other than an aromatic skeleton, and does not have any aromatic skeleton. The trialkylamine does not have any cyclic skeleton or any aromatic skeleton. The aromatic amine has an aromatic skeleton, and does not have any cyclic skeleton other than an aromatic skeleton.

The number of carbon atoms in the cyclic amine is preferably 6 or more and preferably 20 or less. Specific examples of the cyclic amine include 1,4-diazabicyclo[2.2.2]octane (DABCO), diazabicycloundecene (DBU) and diazabicyclononene (DBN).

The three alkyl groups in the trialkylamine may be the same as and may be different from one another. The number of carbon atoms in each of the three alkyl groups in the trialkylamine is 1 or more, preferably 2 or more and preferably 20 or less, more preferably 6 or less. Specific examples of the trialkylamine include trimethylamine, N,N-diethylmethylamine, N,N-dimethylethylamine, triethylamine, N,N-dimethylpropylamine, tripropylamine and tributylamine.

Specific examples of the aromatic amine include N,N-dimethylaminotoluidine, N,N-diethylaminotoluidine, N,N-dimethylaminobenzene, N,N-diethylaminobenzene and N,N,N'N'-tetramethyl-p-phenylenediamine.

When the tertiary amine is used, the content of the tertiary amine is preferably 0.1 part by mass or more, more preferably 0.5 part by mass or more, still more preferably 1 part by mass or more, and preferably 50 parts by mass or less, more preferably 40 parts by mass or less, still more preferably 30 parts by mass or less relative to 100 parts by mass of the gas-generating agent. When the content of the tertiary amine is equal to or larger than the lower limit and is equal to or smaller than the upper limit, the amount of a gas generated per unit time in the gas-generating material can be increased effectively and the storage stability can be improved effectively.

(Photosensitizer)

The gas-generating material preferably contains a photosensitizer. The photosensitizer has an effect of amplifying the stimulus to the gas-generating agent by light. Therefore, when the gas-generating material contains the photosensitizer, it becomes possible to generate and release a gas with a smaller irradiance level of light. It also becomes possible to generate and release the gas only with light having a wider wavelength region. Only one type of the photosensitizer may be used, or two or more types of the photosensitizers may also be used in combination.

The photosensitizer is not particularly limited. As the photosensitizer, any known photosensitizer can be used. Examples of the photosensitizer include a thioxanthone compound, a phenothiazine compound, an anthracene compound and an acridone compound.

Specific examples of the thioxanthone compound include thioxanthone, 2-chlorothioxanthone, 2,4-dichlorothioxanthone, 1-chloro-4-propoxythioxanthone, 2-isopropylthioxanthone, 4-isopropylthioxanthone and 2,4-diethylthioxanthone.

Specific examples of the phenothiazine compound include phenothiazine, 2-chlorophenothiazine, 2-methylthiophenothiazine, 2-methoxyphenothiazine and 2-(trifluoromethyl)phenothiazine.

Specific examples of the anthracene compound include anthracene, 9,10-diethoxyanthracene, 9,10-dipropoxyanthracene, 9,10-dibutoxyanthracene, 9-carboxyanthracene, 2-anthracenecarboxylic acid, 1-anthracenecarboxylic acid, dimethyl 1,8-anthracenedicarboxylate, (1R,2R)-2-(anthracene-2,3-dicarboxyimide)cyclohexanecarboxylic acid, 1-aminoanthracene, 2-anthraceneboronic acid, 9-chloromethylanthracene, sodium 9,10-dimethoxyanthracene-2-sulfonate, benzanthrene, benz[a]anthracene-7,12-dione, dibenz[a,c]anthracene, 1,2,3,4-dibenzanthracene, 9-bromoanthracene, 9,10-bis(chloromethyl)anthracene, 7-bromobenz[a]anthracene, 1,8-bis(hydroxymethyl)anthracene, 9,10-bis(3,5-dihydroxyphenyl)anthracene, 1-bromoanthracene, 2-bromoanthracene, 9,10-bis(diethylphosphonomethyl)anthracene, 2-bromo-9,10-diphenylanthracene, 2-t-butylanthracene, 9-chloromethylanthracene, 9-cyanoanthracene, 1-chloro-9, 10-bis(phenylethynyl)anthracene, 2-chloroanthracene, dibenz[a,h]anthracene, 9,10-dibromoanthracene, 9,10-dimethylanthracene, 9,10-dihydroanthracene, 7,12-dimethylbenz[a]anthracene, 9,10-dicyanoanthracene, 9,10-diphenylanthracene, 2,3-dimethylanthracene, 2,6-dibromoanthracene, 1,5-dibromoanthracene, (11R,12R)-9,10-dihydro-9,10-ethanoanthracene-11,12-diamine, 9,10-dihydro-9,10-bis(2-carboxyethyl)-N-(4-nitrophenyl)-10, 9-(epoxyimino)anthracene-12-carboxamide, 9,10-di(1-naphthyl)anthracene, 9,10-di(2-naphthyl)anthracene, 1,8-diiodoanthracene, 9-(hydroxymethyl)anthracene, 2-(hydroxymethyl)anthracene, 9-(2-hydroxyethyl)anthracene, 9-methylanthracene, 7-methylbenz[a]anthracene, 2,3-benzanthracene, dibenz[de,kl]anthracene, 9-phenylanthracene, 9,10-bis(phenylethynyl)anthracene, 1-anilinoanthracene, 2-anilinoanthracene, 1,4,9,10-tetrahydroxyanthracene, 1,8,9-trihydroxyanthracene, (R)-(−)-α-(trifluoromethyl)-9-anthracenemethanol, (S)-(+)-α-(trifluoromethyl)-9-anthracenemethanol and 9,10-dihydro-9,10-[1,2]benzenoanthracene.

Specific examples of the acridone compound include 10-methyl-9(10H)acridone, 9(10H)-acridone and 10-butyl-2-chloro-9(10H)-acridone.

For the purpose of increasing the amount of a gas generated per unit time, it is preferred that the photosensitizer contains at least one compound selected from the group consisting of a thioxanthone compound, a phenothiazine compound, an anthracene compound and an acridone compound. The photosensitizer is preferably a thioxanthone compound, is preferably a phenothiazine compound, is preferably an anthracene compound, and is also preferably an acridone compound.

As for the photosensitizer, a polycyclic aromatic compound having an alkoxy group may also be mentioned. The polycyclic aromatic compound may have two or more alkoxy groups. Particularly, a polycyclic aromatic compound having an alkoxy group containing a glycidyl group or a hydroxyl group is preferred. The polycyclic aromatic compound of this type is preferably a substituted alkoxy polycyclic aromatic compound having an alkoxy group in which a part of the alkoxy group is substituted by a glycidyl group or a hydroxyl group. This photosensitizer has high sublimation resistance, and therefore can be used under high-temperature conditions. Further, since a part of the alkoxy group is substituted by a glycidyl group or a hydroxyl group, the solubility in the gas-generating material can be increased and the occurrence of bleeding out can be prevented.

A preferred example of the polycyclic aromatic compound to be used as the photosensitizer is a polycyclic aromatic compound having an anthracene skeleton. The polycyclic aromatic compound having an anthracene skeleton is an anthracene compound having an alkoxy group, and includes an anthracene derivative and the like. In the polycyclic aromatic compound having an alkoxy group, the number of carbon atoms in the alkoxy group is 1 or more and preferably 18 or less, more preferably 8 or less.

Specific examples of the polycyclic aromatic compound having an alkoxy group include 9,10-dimethoxyanthracene, 2-ethyl-9,10-dimethoxyanthracene, 2-t-butyl-9,10-dimethoxyanthracene, 2,3-dimethyl-9,10-dimethoxyanthracene, 9-methoxy-10-methylanthracene, 9,10-diethoxyanthracene, 2-ethyl-9,10-diethoxyanthracene, 2-t-butyl-9,10-diethoxyanthracene, 2,3-dimethyl-9,10-diethoxyanthracene, 9-ethoxy-10-methylanthracene, 9,10-dipropoxyanthracene, 2-ethyl-9,10-dipropoxyanthracene, 2-t-butyl-9,10-dipropoxyanthracene, 2,3-dimethyl-9,10-dipropoxyanthracene, 9-isopropoxy-10-methylanthracene, 9,10-dibutoxyanthracene, 9,10-dibenzyloxyanthracene, 2-ethyl-9,10-dibenzyloxyanthracene, 2-t-butyl-9,10-dibenzyloxyanthracene, 2,3-dimethyl-9,10-dibenzyloxyanthracene, 9-benzyloxy-10-methylanthracene, 9,10-di-α-methylbenzyloxyanthracene, 2-ethyl-9,10-di-α-methylbenzyloxyanthracene, 2-t-butyl-9,10-di-α-methylbenzyloxyanthracene, 2,3-dimethyl-9,10-di-α-methylbenzyloxyanthracene, 9-(α-methylbenzyloxy)-10-methylanthracene, 9,10-di(2-hydroxyethoxy)anthracene and 2-ethyl-9,10-di(2-carboxyethoxy)anthracene.

Specific examples of the polycyclic aromatic compound having an alkoxy group containing a glycidyl group or a hydroxyl group include 9,10-di(glycidyloxy)anthracene, 2-ethyl-9,10-di(glycidyloxy)anthracene, 2-t-butyl-9,10-di(glycidyloxy)anthracene, 2,3-dimethyl-9,10-di(glycidyloxy)anthracene, 9-(glycidyloxy)-10-methylanthracene, 9,10-di(2-vinyloxyethoxy)anthracene, 2-ethyl-9,10-di(2-vinyloxyethoxy)anthracene, 2-t-butyl-9,10-di(2-vinyloxyethoxy)anthracene, 2,3-dimethyl-9,10-di(2-vinyloxyethoxy)anthracene, 9-(2-vinyloxyethoxy)-10-methylanthracene, 9,10-di(3-methyl-3-oxetanylmethoxy)anthracene, 2-ethyl-9,10-di(3-methyl-3-oxetanylmethoxy)anthracene, 2-t-butyl-9,10-di(3-methyl-3-oxetanylmethoxy)anthracene, 2,3-dimethyl-9,10-di(3-methyl-3-oxetanylmethoxy)anthracene, 9-(3-methyl-3-oxetanylmethoxy)-10-methylanthracene, 9,10-di(p-epoxyphenylmethoxy)anthracene, 2-ethyl-9,10-di(p-epoxyphenylmethoxy)anthracene, 2-t-butyl-9,10-di(p-epoxyphenylmethoxy)anthracene, 2,3-dimethyl-9,10-di(p-epoxyphenylmethoxy)anthracene, 9-(p-epoxyphenylmethoxy)-10-methylanthracene, 9,10-di(p-vinylphenylmethoxy)anthracene, 2-ethyl-9,10-di(p-vinylphenylmethoxy)anthracene, 2-t-butyl-9,1-di(p-vinylphenylmethoxy)anthracene, 2,3-dimethyl-9,10-di(p-vinylphenylmethoxy)anthracene, 9-(p-vinylphenylmethoxy)-10-methylanthracene, 9,10-di(2-hydroxyethoxy)anthracene, 9,10-di(2-hydroxypropoxy)anthracene, 9,10-di(2-hydroxybutoxy)anthracene, 9,10-di(2-hydroxy-3-butoxypropoxy)anthracene, 9,10-di(2-hydroxy-3-(2-ethylhexyloxyl)propoxy)anthracene, 9,10-di(2-hydroxy-3-allyloxypropoxy)anthracene, 9,10-di(2-hydroxy-3-phenoxypropoxy)anthracene and 9,10-di(2,3-dihydroxypropoxy)anthracene.

The photosensitizer may be a material which is generally known as a photopolymerization initiator. As an example of the photosensitizer of this type, a compound which can be activated upon the irradiation with light having a wavelength of 250 to 800 nm can be mentioned. Specific examples of the photosensitizer of this type include an acetophenone compound such as methoxyacetophenone; a benzoin ether compound such as benzoin propyl ether and benzoin isobutyl ether; a ketal compound such as benzyl dimethyl ketal and acetophenone diethyl ketal; a phosphine oxide compound; a titanocene compound such as bis(η5-cyclopentadienyl)titanocene; benzophenone; Michler's ketone; chlorothioxanthone; dodecylthioxanthone; dimethylthioxanthone; diethylthioxanthone; α-hydroxycyclohexyl phenyl ketone; and 2-hydroxymethylphenylpropane. Anyone of the above-mentioned photosensitizers may be used singly, or any two or more of the above-mentioned photosensitizers may be used in combination.

When the photosensitizer is used, the content of the photosensitizer is preferably 0.1 part by mass or more, more preferably 0.5 part by mass or more, and preferably 50 parts by mass or less, more preferably 30 parts by mass or less relative to 100 parts by mass of the gas-generating agent. The content of the photosensitizer is preferably 0.5 part by mass or more, more preferably 1 part by mass or more, and preferably 30 parts by mass or less, more preferably 15 parts by mass or less relative to 100 parts by mass of the binder resin. When the content of the photosensitizer is equal to or larger than the lower limit, a sufficient photosensitizing effect can be achieved. When the content of the photosensitizer is equal to or smaller than the upper limit, a remaining material derived from the photosensitizer can be reduced and, therefore, the gas can be generated more readily.

When the tertiary amine and the photosensitizer are used in combination, it is preferred that the photosensitizer and the tertiary amine are added in such a manner that the amount of the tertiary amine becomes an equimolar amount to that of the photosensitizer. It is considered that the tertiary amine is not consumed upon the generation of a gas. Therefore, the tertiary amine can be added in an amount that is smaller than the molar equivalent of the gas-generating agent. In the gas-generating agent, the molar equivalent of the tertiary amine is preferably equal to or smaller than the molar equivalent of the gas-generating agent.

With respect to the term "equivalent" as used herein, one nitrogen atom in the amine is defined as one equivalent and one molecule of the photosensitizer is defined as one equivalent.

(Tackifier)

The gas-generating material preferably contains the tackifier. When the tackifier is used, the initial adhesion force and the initial anchoring force of the gas-generating material to a member to be adhered can be further improved. From the viewpoint of the further improvement in the transparency of the gas-generating material, it is preferred that the tackifier has a Hazen color number of 200 or less. From the viewpoint of the further improvement in the compatibility of the tackifier with other components to further improve the transparency of the gas-generating material, it is preferred that the tackifier has a SP value of 8.5 or more.

From the viewpoint of the production of a gas-generating material that has better transparency, the smaller the Hazen color number of the tackifier is, the better it is. The Hazen color number of the tackifier is more preferably 100 or less, still more preferably 50 or less.

The Hazen color number is determined in accordance with JIS K0071-1. The Hazen color number can be measured using, for example, a color dye meter CT-5 manufactured by Konica Minolta, Inc.

From the viewpoint of the production of a gas-generating material that has better transparency, the larger the SP value of the tackifier is, the better it is. The SP value of the tackifier is more preferably 8.8 or more. The upper limit of the tackifier is not particularly limited.

The SP value of the tackifier can be determined using a Hoy's constant in equation (S) shown below.

$$\delta = D \cdot \Sigma G/M \qquad (S)$$

δ: solubility parameter
D: density
G: molar attraction constant for each functional group
M: molecular weight Examples of the tackifier include a rosin resin, a terpene resin, a styrene resin and a petroleum resin.

From the viewpoint of the further improvement in the initial adhesion force and the initial anchoring force of the gas-generating material to a member to be adhered and the further prevention of the decrease in the adhesion force and the anchoring force of the gas-generating material which is associated with the generation of a gas, the tackifier is preferably a rosin resin, more preferably a rosin ester resin. The tackifier does not have to have a (meth)acryloyl group.

The rosin resin is a resin containing rosin or a rosin derivative as a base. Preferred examples of the rosin resin include rosin, an acid-modified rosin, a rosin-containing diol, a rosin ester, a hydrogenated rosin ester and a maleic acid-modified rosin ester. An example of the acid-modified rosin is an acrylic acid-modified rosin.

The terpene resin is a resin containing a terpene compound or a derivative of a terpene compound as a base. Examples of the terpene resin include a modified terpene resin and a terpene phenolic resin.

The styrene resin is a resin containing a styrene compound or a derivative of a styrene compound as a base. Examples of the styrene resin include a modified styrene resin and a phenolic alpha-methyl styrene.

From the viewpoint of the effective improvement in the initial adhesion force and the initial anchoring force of the gas-generating material to a member to be adhered, it is preferred that the tackifier has a hydroxyl value of 20 or more, and it is more preferred that the tackifier is a rosin ester resin and the rosin ester resin has a hydroxyl value of 20 or more.

When the tackifier is used, the content of the tackifier in the gas-generating material is preferably 1 part by mass or more, more preferably 3 parts by mass or more, still more preferably 10 parts by mass or more, and preferably 50 parts by mass or less, more preferably 35 parts by mass or less, still more preferably 25 parts by mass or less, particularly preferably 20 parts by mass or less, most preferably 15 parts by mass or less relative to 100 parts by mass of the gas-generating agent. Particularly, it is preferred that the content of the rosin resin or the rosin ester resin is equal to or larger than the lower limit and is equal to or smaller than the upper limit. When the content of the tackifier is equal to or larger than the lower limit, the initial adhesion force and the initial anchoring force of the gas-generating material to a member to be adhered is further improved. Furthermore, when the content of the tackifier is equal to or smaller than the upper limit, the transparency of the gas-generating material is further improved and the decrease in the amount of a generated gas caused by excess tackifier can be prevented more effectively.

(Other Components)

The gas-generating material may contain a cross-linking agent, an inorganic filler and the like. The gas-generating material more preferably contains the cross-linking agent. The gas-generating material does not have to contain the cross-linking agent. When the cross-linking agent is used, the adhesion force of the gas-generating material can be further improved.

Other Embodiments

FIG. 2 is a schematic cross-sectional view of a micropump according to a second embodiment of the present invention.

A micropump 2 illustrated in FIG. 2 is different from the micropump 1 according to the above-mentioned embodiment with respect to the shape of a gas-generating material 11b and the shape of the base 10.

In the second embodiment, the micro flow path 10b is connected to a pump chamber 10c formed in the base 10. The gas-generating material 11b is formed in a block-like shape and is arranged in the pump chamber 10c.

In the micropump 2 according to the second embodiment, like in the case of the micropump 1, high output and a long driving time can also be achieved.

Hereinafter, the present invention is described in more detail with reference to specific examples. The present invention is not limited to the examples mentioned below in any way, and can be practiced with proper modifications within the scope in which the subject matter of the present invention is not altered.

As the blended components of gas generating materials of Examples 1 to 14 and Comparative Examples 1 to 6, the following materials were provided.

(Binder Resins/Acrylic Pressure-Sensitive Adhesive Agents)

Synthesis Example 1 n-Butyl acrylate (manufactured by Nippon Shokubai Co., Ltd.) (97 parts by mass), acrylic acid (manufactured by Nippon Shokubai Co., Ltd.) (3 parts by mass), Irgacure 907 (manufactured by NAGASE & CO., LTD.) (0.05 part by mass) and ethyl acetate (200 parts by mass) were mixed together to produce a mixture. Subsequently, the mixture was irradiated with ultraviolet rays for 4 hours to produce a binder resin A (acrylic pressure-sensitive adhesive agent A) that is an acrylic copolymer. The weight average molecular weight of the binder resin A was about 700,000. The SP value of the binder resin A was 7 or more and 10.5 or less.

Example 1

The binder resin A (100 parts by mass) was blended with ethyl acetate (567 parts by weight) that is a solvent. The binder resin A (100 parts by mass) (with which ethyl acetate (567 parts by mass) that served as a solvent had been mixed), GAP4006 (a glycidyl azide polymer, manufactured by NOF Corporation) (110 parts by mass) that served as a gas-generating agent, N-2-(aminoethyl)-3-aminopropylmethyl-dimethoxysilane (KBM-602, manufactured by Shin-Etsu Chemical Co., Ltd.) (0.001 part by mass) that served as a silane coupling agent having an amino group, tripropylamine (tri-n-propylamine) (2 parts by mass) that served as a tertiary amine, 2-isopropylthioxanthone (IPX, manufactured by DKSH JAPAN K. K.) (3.5 parts by mass) that served as a photosensitizer, and N,N,N',N'-tetraglycidyl-1,3-benzenedi(methaneamine) (E-AX, a 5% solution in toluene, manufactured by Soken Chemical & Engineering Co., Ltd.) (0.5 part by mass) that served as a cross-linking agent were mixed together, and the resultant mixture was processed into a film. The film was heated at 110° C. for 5 minutes to remove ethyl acetate that is a solvent therefrom. The resultant film was protected by a mold-release PET film, then stored at ambient temperature for 1 day (24 hours), thereby producing a film-like gas-generating material.

The film-like gas-generating material thus produced was used to produce a micropump having substantially the same structure as the micropump 1 according to the above-mentioned first embodiment.

The cross-section of a micro flow path 10b had a rectangular shape of 0.5 mm square. The length of the micro flow path 10b was 800 mm. The tip of the micro flow path 10b was opened to the atmosphere. The gas-generating material had a film-like shape having a diameter of 0.6 cm and a thickness of 50 μm.

Examples 2 to 14 and Comparative Examples 1 to 6

The same procedure as in Example 1 was carried out, except that the types and the amounts (unit: part by mass) of the blended components were changed as shown in Tables 1 and 2 below, thereby producing gas-generating materials and manufacturing micropumps. In Examples 2 to 14, silane coupling agents each having an amino group were used. In Comparative Examples 1, 2, 4 and 6, silane coupling agents each having no amino group were used. In Comparative Examples 3 and 6, no silane coupling agent was used.

The types of the silane coupling agents are as follows.
N-2-(aminoethyl)-3-aminopropylmethyldimethoxysilane (KBM-602, manufactured by Shin-Etsu Chemical Co., Ltd.)
N,N-bis[(3-trimethoxysilyl)propyl]ethylenediamine (manufactured by Gelest, Inc.)
3-Aminopropyitrimethoxysilane (KBM-903, manufactured by Shin-Etsu Chemical Co., Ltd.)
3-Aminopropyltriethoxysilane (KBE-903, manufactured by Shin-Etsu Chemical Co., Ltd.)
(3-Trimethoxysilylpropyl)diethylenetriamine (SIT8398.0, manufactured by Gelest, Inc., 95%, $H_2NCH_2CH_2NHCH_2CH_2NHCH_2CH_2CH_2Si(OCH_3)_3$)
n-Butylaminopropyltrimethoxysilane (SIB1932.2, manufactured by Gelest, Inc., $C_4H_9NHCH_2CH_2CH_2Si(OCH_3)_3$)
Bis(triethoxysilylpropyl)amine (SIB1824.5, manufactured by Gelest, Inc., 95%, $[(C_2H_5O)_3SiCH_2CH_2CH_2]_2NH$)
Bis(trimethoxysilylpropyl)amine (SIB1833, manufactured by Gelest, Inc., 95%, $[(CH_3O)_3SiCH_2CH_2CH_2]_2NH$)
Bis[(3-trimethoxysilyl)propyl]ethylenediamine (SIB1834.0, manufactured by Gelest, Inc., 62%, solvent: methanol, $(CH_3O)_3SiCH_2CH_2CH_2NHCH_2CH_2NHCH_2CH_2Si(OCH_3)_3$)
N-(2-aminoethyl)-3-aminopropylmethyltrimethoxysilane (SIA0591.0, manufactured by Gelest, Inc., $H_2NCH_2CH_2NHCH_2CH_2CH_2Si(OCH_3)_3$)
3-Glycidoxypropyltriethoxysilane (KBE-403, manufactured by Shin-Etsu Chemical Co., Ltd.)
3-Methacryloxypropylmethyldiethoxysilane (KBE-502, manufactured by Shin-Etsu Chemical Co., Ltd.)

Evaluation of Examples 1 to 14 and Comparative Examples 1 to 6

(1) Amount of Generated Gas

In the measurement of the amount of a generated gas, the amount of a gas generated upon the irradiation using an ultraviolet ray LED ("NS375L-5RFS," manufactured by Nitride Semiconductors Co., Ltd.) at 380 nm for 120 seconds in each of the manufactured micropumps was measured. The method for measuring the amount of a generated gas was as follows: a micro flow path 10b was connected to a measuring pipette through a silicon tube and then filled with water, subsequently the gas-generating material was irradiated with ultraviolet rays, and the change in the volume of the measuring pipette which was caused by the generated gas was read.

(2) Adhesion Force

As illustrated in FIG. 3, a film-like gas-generating material 52 was attached onto a polycarbonate plate 51. In this state, the adhesion force was evaluated.

Specifically, the adhesion force was evaluated by carrying out 180° peeling in the direction indicated by the arrow Y1 using a tensile tester ("AG-IS," manufactured by Shimadzu Corporation). The conditions for measurement were as follows: peel rate: 300 mm/min, peel width: 25 mm, and measurement temperature: 23° C.

(3) Anchoring Force

As illustrated in FIG. 4, a pressure-sensitive adhesive agent layer 61B face (a glue face) of a cellophane tape 61 (which had both a base 61A and the pressure-sensitive adhesive layer 61B) was adhered to the resultant film-like gas-generating material 62. In this state, anchoring force was evaluated.

Specifically, the peel strength (anchoring force) was evaluated by carrying out 90° peeling in the direction indicated by the arrow Y2 using a tensile tester ("AG-IS," manufactured by Shimadzu Corporation). The conditions for measurement were as follows: peel rate: 300 ram/min, peel width: 16 mm, and measurement temperature: 23° C.

The results are shown in Tables 1 and 2 below. With respect to each of the gas-generating materials of Examples 1 to 4, since a tertiary amine was used, the degree of decrease in the amount of a generated gas was small even after the elapse of 24 hours and after the elapse of 10 days, the amount of the gas generated after the elapse of 10 days relative to the amount (μL) of the gas after the elapse of 24 hours (i.e., the increase or decrease in the amount of the generated gas) was 90% or more and 105% or less wherein the amount (μL) of the gas after the elapse of 24 hours was 100%, and therefore the storage stability of each of the gas-generating materials was excellent.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Binder resin | Binder resin A | 100 | 100 | 100 | 100 | 100 | 100 | 100 |
| Gas-generating agent | GAP4006 | 110 | 110 | 110 | 110 | 110 | 110 | 110 |
| Photosensitizer | IPX | 3.5 | 3.5 | 3.5 | 3.5 | 3.5 | 3.5 | 3.5 |
| Cross-linking agent | E-AX | 0.5 | 0.5 | 0.5 | 0.5 | 0.5 | 0.5 | 0.5 |
| Tertiary amine | Tripropylamine | 2 | 2 | 2 | 2 | 2 | 2 | 2 |
| Silane coupling agent (having amino group) | KBM-602 | 0.001 |  |  |  |  |  |  |
|  | N,N-bis[(3-trimethoxysilyl)propyl]ethylenediamine |  | 0.001 |  |  |  |  |  |
|  | KBM-903 |  |  | 0.001 |  |  |  |  |
|  | KBE-903 |  |  |  | 0.001 |  |  |  |
| Silane coupling agent (having no amino group) | KBE-403 |  |  |  |  | 0.001 |  |  |
|  | KBE-502 |  |  |  |  |  | 0.001 |  |
| Amount of generated gas (μL) for 120 seconds |  | 24 | 24 | 23 | 23 | 18 | 19 | 25 |
| Adhesion force (N/25 mm) |  | 0.330 | 0.145 | 0.165 | 0.120 | 0.011 | 0.009 | 0.005 |
| Anchoring force (N/16 mm) |  | 1.31 | 0.85 | 1.71 | 1.45 | 0.29 | 0.09 | 0.28 |

TABLE 2

|  |  | Ex. 5 | Ex. 6 | Ex. 7 | Ex. 8 | Ex. 9 | Ex. 10 | Ex. 11 |
|---|---|---|---|---|---|---|---|---|
| Binder resin | Binder resin A | 100 | 100 | 100 | 100 | 100 | 100 | 100 |
| Gas-generating agent | GAP4006 | 110 | 110 | 110 | 110 | 110 | 110 | 110 |
| Photosensitizer | IPX | 3.5 | 3.5 | 3.5 | 3.5 | 3.5 | 3.5 | 3,5 |
| Cross-linking agent | E-AX | 0.5 | 0.5 | 0.5 | 0.5 | 0.5 | 0.5 | 0.5 |
| Tertiary amine | Tripropylamine |  |  |  |  |  |  |  |
| Silane coupling agent (having amino group) | KBM-602 | 0.001 |  |  |  |  |  |  |
|  | N,N-bis[(3-trimethoxysilyl)propyl]ethylenediamine |  | 0.001 |  |  |  |  |  |
|  | KBM-903 |  |  | 0.001 |  |  |  |  |
|  | KBE-903 |  |  |  | 0.001 |  |  |  |
|  | SIT8398.0 |  |  |  |  | 0.001 |  |  |
|  | SIB1932.2 |  |  |  |  |  | 0.001 |  |
|  | SIB1824.5 |  |  |  |  |  |  | 0.001 |
|  | SIB1833 |  |  |  |  |  |  |  |
|  | SIB1834.0 |  |  |  |  |  |  |  |
|  | SIA0591.0 |  |  |  |  |  |  |  |
| Silane coupling agent (having no amino group) | KBE-403 |  |  |  |  |  |  |  |
|  | KBE-502 |  |  |  |  |  |  |  |
| Amount of generated gas (μL) for 120 seconds |  | 24 | 23 | 23 | 23 | 24 | 23 | 23 |
| Adhesion force (N/25 mm) |  | 0.300 | 0.140 | 0.150 | 0.110 | 0.280 | 0.120 | 0.180 |
| Anchoring force (N/16 mm) |  | 1.21 | 0.91 | 1.62 | 1.43 | 1.31 | 1.81 | 1.10 |

|  |  | Ex. 12 | Ex. 13 | Ex. 14 | Comp. Ex. 4 | Comp. Ex. 5 | Comp. Ex. 6 |
|---|---|---|---|---|---|---|---|
| Binder resin | Binder resin A | 100 | 100 | 100 | 100 | 100 | 100 |
| Gas-generating agent | GAP4006 | 110 | 110 | 110 | 110 | 110 | 110 |
| Photosensitizer | IPX | 3.5 | 3.5 | 3.5 | 3.5 | 3.5 | 3.5 |
| Cross-linking agent | E-AX | 0.5 | 0.5 | 0.5 | 0.5 | 0.5 | 0.5 |
| Tertiary amine | Tripropylamine |  |  |  |  |  |  |
| Silane coupling agent (having amino group) | KBM-602 |  |  |  |  |  |  |
|  | N,N-bis[(3-trimethoxysilyl)propyl]ethylenediamine |  |  |  |  |  |  |
|  | KBM-903 |  |  |  |  |  |  |
|  | KBE-903 |  |  |  |  |  |  |
|  | SIT8398.0 |  |  |  |  |  |  |
|  | SIB1932.2 |  |  |  |  |  |  |
|  | SIB1824.5 |  |  |  |  |  |  |

TABLE 2-continued

| | | | | | | | |
|---|---|---|---|---|---|---|---|
| | SIB1833 | 0.001 | | | | | |
| | SIB1834.0 | | 0.001 | | | | |
| | SIA0591.0 | | | 0.001 | | | |
| Silane coupling agent | KBE-403 | | | | 0.001 | | |
| (having no amino group) | KBE-502 | | | | | 0.001 | |
| Amount of generated gas (μL) for 120 seconds | | 23 | 23 | 24 | 19 | 19 | 20 |
| Adhesion force (N/25 mm) | | 0.160 | 0.170 | 0.290 | 0.010 | 0.010 | 0.001 |
| Anchoring force (N/16 mm) | | 1.51 | 1.64 | 2.1 | 0.31 | 0.08 | 0.32 |

As the blended components for the gas-generating materials of Examples 15 to 29, the following materials were provided.

(Binder Resin/Acrylic Pressure-Sensitive Adhesive Agent)

(Synthesis Example 2) Synthesis of Acrylic Pressure-Sensitive Adhesive Agent B n-Butyl acrylate (manufactured by Nippon Shokubai Co., Ltd.) (96 parts by mass), acrylic acid (manufactured by Nippon Shokubai Co., Ltd.) (4 parts by mass), Irgacure 907 (manufactured by NAGASE & CO., LTD.) (0.05 part by mass) and ethyl acetate (200 parts by mass) were mixed together to produce a mixture. Subsequently, the mixture was irradiated with ultraviolet rays for 4 hours to produce a binder resin B (an acrylic pressure-sensitive adhesive agent B) that is an acrylic copolymer. The weight average molecular weight of the binder resin B was about 610,000. The SP value of the binder resin B was 7 or more and 10.5 or less.

(Synthesis Example 3) Synthesis of Acrylic Pressure-Sensitive Adhesive Agent C n-Butyl acrylate (manufactured by Nippon Shokubai Co., Ltd.) (97 parts by mass), acrylic acid (manufactured by Nippon Shokubai Co., Ltd.) (3 parts by mass), Irgacure 907 (manufactured by NAGASE & CO., LTD.) (0.05 part by mass) and ethyl acetate (200 parts by mass) were mixed together to produce a mixture. Subsequently, the mixture was irradiated with ultraviolet rays for 4 hours to produce a binder resin C (an acrylic pressure-sensitive adhesive agent C) that is an acrylic copolymer. The weight average molecular weight of the binder resin C was about 1,000,000. The SP value of the binder resin C was 7 or more and 10.5 or less.

(Tackifier)

KE-359 (a rosin ester resin, "Pine ester KE359," manufactured by Arakawa Chemical Industries, Ltd., Hazen color number: 40, hydroxyl value: 44, SP value: 8.86)

(Cross-Linking Agent)

E-AX (N,N,N',N'-tetraglycidyl-1,3-benzenedi(methaneamine), "E-AX," manufactured by Soken Chemical & Engineering Co., Ltd., a 5% solution in toluene)

AX4-HC-M08 (PVEEA, a 2-(2-vinylxyethoxy) ethyl acrylate polymer (solid content: 100 mass %), a compound having a plurality of structural units each represented by formula (21) shown below; "AX4-HC-M08," manufactured by Nippon Shokubai Co., Ltd.; weight average molecular weight: about 20,000)

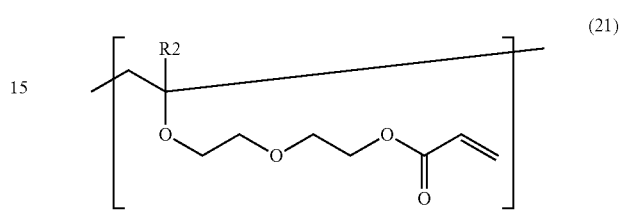

Polyfunctional acrylic monomer A-TMMT (pentaerythritol tetraacrylate, manufactured by Shin-Nakamura Chemical Co., Ltd.)

(Azide Compound Having a Plurality of Azide Groups)

GAP4006 (a glycidyl azide polymer, manufactured by NOF Corporation)

GAP5006 (a glycidyl acrylic polymer, manufactured by NOF Corporation)

(Tertiary Amine)

Tripropylamine (Tri-n-Propylamine)

(Photosensitizer)

2-Isopropyl thioxanthone ("IPX," manufactured by DKSH JAPAN K. K.)

(Silane Coupling Agent)

KEM603 (manufactured by Shin-Etsu Chemical Co., Ltd., N-2-(aminoethyl)-3-aminopropyltrimethoxysilane)

Example 15

Ethyl acetate (220 parts by mass) that served as a solvent was blended with the acrylic pressure-sensitive adhesive agent B (88 parts by mass), then GAP4006 (110 parts by mass), KEM603 (0.002 part by mass) that served as a silane coupling agent, tripropylamine (tri-n-propylamine) (3.5 parts by mass) that was a tertiary amine, 2-isopropylthioxanthone (2.5 parts by mass) that served as a photosensitizer, E-AX (1 part by mass) that served as a cross-linking agent, AX4-HC-M08 (1 part by mass) and KE-359 (12 parts by mass) that served as a tackifier were mixed together, and then the resultant mixture was processed into a film. The film was heated at 110° C. for 5 minutes to remove ethyl acetate that is a solvent therefrom. The resultant film was protected by a mold release PET film and was then stored at ambient temperature for 1 day (24 hours), thereby producing a film-like gas-generating material (film).

A micropump having substantially the same structure as that of the micropump 1 according to the first embodiment mentioned above was produced using the film-like gas-generating material thus produced.

The cross section of a micro flow path 10b has a 0.5 mm-square rectangular shape. The length of the micro flow path 10b was 800 mm. The tip of the micro flow path 10b was opened to the atmosphere. The gas-generating material was shaped into a film having a diameter of 0.6 cm and a thickness of 50 μm.

Examples 16 to 29

The same procedure as in Example 1 was carried out, except that the types and amounts (unit: part by mass) of the blended components were changed to those shown in Table 3 below, thereby producing gas-generating materials and manufacturing micropumps. In Table 3 shown below, the amounts of used solvents that were to be removed by evaporation upon the production of the film-like gas-generating materials were omitted.

Evaluation of Examples 15 to 29

(1) Measurement of Gel Fraction of Gas-Generating Agent

The film (before immersion) (1 g) was immersed in ethyl acetate at 23° C. for 24 hours to produce an immersion solution. The resultant immersion solution was filtrated through a #200-mesh metallic mesh, and a gel remaining on the metallic mesh was collected and then dried at 75° C. for 3 hours, thereby producing a dried film. The mass of the dried film was measured and the gel fraction (mass %) was calculated in accordance with equation (X) shown below.

$$\text{Gel fraction (mass \%)} = (\text{mass of dried film})/(\text{mass of film before immersion}) \times 100 \quad (X)$$

(2) Measurement of Swelling Degree of Gas-Generating Agent

The film (1 g) (weight: W0) was immersed in ethyl acetate at 23° C. for 24 hours. Subsequently, the film was filtrated from ethyl acetate through a #200-mesh metallic mesh, and then the weight (W1) of the film was measured. The swelling degree of the gas-generating agent was determined from the weight (W1) of the film after immersion and the weight (W0) of the film before immersion in accordance with equation (Y) shown below. Prior to the measurement of the weight, the solvent attached onto the mesh was wiped off using filter paper.

$$\text{Swelling degree (\%)} = (W1 - Wm)/W0 \times 100 (\%) \quad (Y)$$

Wm: weight of mesh (3) Measurement of Amount of Generated Gas

The evaluation was carried out in the same manner as in Examples 1 to 14 and Comparative Examples 1 to 6.

(4) Adhesion Force

The evaluation was carried out in the same manner as in Examples 1 to 14 and Comparative Examples 1 to 6.

(5) Anchoring Force

The evaluation was carried out in the same manner as in Examples 1 to 14 and Comparative Examples 1 to 6.

(6) Stray

A gas generation test was carried out by inserting a silicon pipe having an inner diameter of 10 µm and a length of 100 mm between a measurement pipette and a micro flow path using a gas generation measurement device. In this test, a gas generation tape was divided into a light-irradiated part and a light-blocked part using a mask having a diameter of 6 mm. The tape after the generation of a gas was observed, and the diameters of air bubbles contained in the tape were measured, which were employed as stray distances. The minimum value among the stray distances was 6 mm. When the stray distance exceeded 7 mm, the tape was in contact with an adjacent gas pump. Therefore, in this case, the tape was determined as "unacceptable."

(7) Retaining Force

A 25 mm-wide adhesive tape was attached to a polycarbonate plate in the same manner as in the measurement of adhesion force, thereby producing a test specimen. A 20-g weight was put at an end of the test specimen, and then the test specimen was maintained in a room which was conditioned at 23° C. and 60% RH.

After 24 hours, the movement (peel) distance of the tape was measured, which was employed as a peel distance. A peel distance of 3 mm or less was determined as "acceptable" and a peel distance of more than 3 mm was determined as "unacceptable."

The results are shown in Table 3 below. In Examples 27 to 29, although the results of the items (6) Stray and (7) Retaining force were slightly poor, the evaluation results of the items (3) Measurement of amount of generated gas, (4) Adhesion force and (5) Anchoring force were excellent, particularly the evaluation results of the item (3) Measurement of amount of generated gas were excellent. Therefore, the gas-generating materials of Examples 27 to 29 can be used as gas-generating materials according to one embodiment of the present invention. In Examples 27 to 29, although the evaluation results of the items (6) Stray and (7) Retaining force were slightly poor, the gas-generating materials of these examples can be advantageously used by changing the design of a micropump.

TABLE 3

| | | | Ex. 15 | Ex. 16 | Ex. 17 | Ex. 18 | Ex. 19 | Ex. 20 | Ex. 21 | Ex. 22 |
|---|---|---|---|---|---|---|---|---|---|---|
| Blended components (part by mass) | Binder resin Acrylic pressure-sensitive adhesive agent | Acrylic pressure-sensitive adhesive agent B (Synthesis Example 2) | 88 | 88 | 88 | 88 | 88 | 88 | 85 | 94 |
| | | Acrylic pressure-sensitive adhesive agent C (Synthesis Example 3) | | | | | | | | |
| | Tackifier | KE-359 | 12 | 12 | 12 | 12 | 12 | 12 | 15 | 5 |
| | Cross-linking agent | E-AX | 1 | 1 | 1 | 1 | 2 | 3 | 2 | 3 |
| | | AX4-HC-M08 | 1 | 3 | 5 | 9 | 3 | 3 | 3 | 5 |
| | | Polyfunctional acrylic monomer A - TMMT | | | | | | | | |
| | Azide compound | GAP4006 | 110 | 110 | 110 | 110 | 110 | 110 | 110 | 110 |
| | | GAP5006 | | | | | | | | |
| | Tertiary amine | Tripropylamine | 3.5 | 3.5 | 3.5 | 3.5 | 3.5 | 3.5 | 3.5 | 3.5 |
| | Photosensitizer | 2-Isopropylthioxanthone | 2.5 | 2.5 | 2.5 | 2.5 | 2.5 | 2.5 | 2.5 | 2.5 |
| | Silane coupling agent | KEM603 | 0.002 | 0.002 | 0.002 | 0.002 | 0.002 | 0.002 | 0.002 | 0.002 |
| Evaluation | | (1) Gel fraction (mass %) | 35 | 41 | 47 | 55 | 49 | 51 | 44 | 51 |
| | | (2) Swelling degree (%) | 2100 | 1171 | 945 | 610 | 820 | 750 | 1020 | 680 |
| | | (3) Amount of generated gas (µL) | 23 | 25 | 24 | 22 | 23 | 24 | 25 | 23 |

TABLE 3-continued

| | | | | | | | | | |
|---|---|---|---|---|---|---|---|---|---|
| (4) Adhesion force (N/25 mm) | | | 0.79 | 0.17 | 0.26 | 0.17 | 0.22 | 0.15 | 0.28 | 0.22 |
| (5) Anchoring force (N/16 mm) | | | 3.01 | 2.04 | 2.06 | 1.86 | 2.00 | 1.87 | 2.45 | 2.20 |
| (6) Stray: stray distance (mm) | | | 6.7 | 6.4 | 6.0 | 6.0 | 6.2 | 6 | 6.2 | 6.1 |
| (7) Retaining force: detached distance (mm) | | | 2.2 | 0.9 | 0 | 0 | 0.3 | 0.3 | 1.2 | 0 |

| | | | Ex. 23 | Ex. 24 | Ex. 25 | Ex. 26 | Ex. 27 | Ex. 28 | Ex. 29 |
|---|---|---|---|---|---|---|---|---|---|
| Blended components (part by mass) | Binder resin Acrylic pressure-sensitive adhesive agent | Acrylic pressure-sensitive adhesive agent B (Synthesis Example 2) | 94 | 94 | 88 | 88 | | 88 | 88 |
| | | Acrylic pressure-sensitive adhesive agent C (Synthesis Example 3) | | | | | 100 | | |
| | Tackifier | KE-359 | 9 | 9 | 12 | 12 | | 12 | 12 |
| | Cross-linking agent | E-AX | 5 | 1 | 3 | 5 | 0.5 | 2 | 3 |
| | | AX4-HC-M08 | 3 | 3 | 3 | | | | |
| | | Polyfunctional acrylic monomer A - TMMT | | | | 5 | | | |
| | Azide compound | GAP4006 | 110 | 110 | | 110 | 110 | 110 | 110 |
| | | GAP5006 | | | 110 | | | | |
| | Tertiary amine | Tripropylamine | 3.5 | 3.5 | 3.5 | 3.5 | 3.5 | 3.5 | 3.5 |
| | Photosensitizer | 2-Isopropylthioxanthone | 2.5 | 2.5 | 2.5 | 2.5 | 2.5 | 2.5 | 2.5 |
| | Silane coupling agent | KEM603 | 0.002 | 0.002 | 0.002 | 0.002 | 0.002 | 0.002 | 0.002 |
| Evaluation | (1) Gel fraction (mass %) | | 52 | 45 | 41 | 43 | 35 | 34 | 40 |
| | (2) Swelling degree (%) | | 600 | 750 | 1150 | 1750 | 4900 | 1534 | 820 |
| | (3) Amount of generated gas (μL) | | 23 | 24 | 25 | 24 | 25 | 23 | 23 |
| | (4) Adhesion force (N/25 mm) | | 0.20 | 0.15 | 0.40 | 0.51 | 0.25 | 1.03 | 0.09 |
| | (5) Anchoring force (N/16 mm) | | 2.10 | 2.10 | 1.89 | 2.20 | 0.98 | 2.58 | 2.58 |
| | (6) Stray: stray distance (mm) | | 6.1 | 6.5 | 6.5 | 6.4 | 8.9 | 8.4 | 8.5 |
| | (7) Retaining force: detached distance (mm) | | 0.3 | 1.2 | 1.2 | 0.7 | Falling | Falling | 35 |

EXPLANATION OF SYMBOLS 1, 2 . . . Micropump
10 . . . Base
10a . . . Main surface
10b . . . Micro flow path
10c . . . Pump chamber
11a, 11b . . . Gas-generating material
12 . . . Gas barrier layer
21 . . . Light irradiation device

The invention claimed is:

1. A gas-generating material comprising:
an acrylic pressure-sensitive adhesive agent;
a gas-generating agent which is an azo compound or an azide compound; and
an alkoxysilane coupling agent having an amino group,
wherein the gas-generating material is capable of being used in a micropump.

2. The gas-generating material according to claim 1, wherein the azide compound has a sulfonylazide group or an azidomethyl group.

3. The gas-generating material according to claim 1, wherein the gas-generating material additionally contains a photosensitizer.

4. The gas-generating material according to claim 3, wherein the photosensitizer comprises at least one compound selected from the group consisting of a thioxanthone compound, a phenothiazine compound, an anthracene compound and an acridone compound.

5. The gas-generating material according to claim 1, wherein the content of the silane coupling agent having an amino group is 0.0001 parts by mass or more and 1 part by mass or less relative to 100 parts by mass of the gas-generating agent.

6. The gas-generating material according to claim 1, wherein the gas-generating agent is an azide compound, and the azide compound is produced by blending an azide compound having a plurality of azide groups with a polymer having a carbon-carbon double bond.

7. The gas-generating material according to claim 6, wherein the polymer having a carbon-carbon double bond has at least one of a vinyl group and a (meth)acryloyl group as a group containing a carbon-carbon double bond.

8. The gas-generating material according to claim 7, wherein the polymer having a carbon-carbon double bond has both a vinyl group and a (meth)acryloyl group as groups each containing a carbon-carbon double bond.

9. The gas-generating material according to claim 6, wherein the polymer having a carbon-carbon double bond has a plurality of carbon-carbon double bonds.

10. A micropump equipped with the gas-generating material as recited in claim 1 and a base having a micro flow path formed therein, and the gas-generating material being so arranged that a gas generated in the gas-generating material is supplied to the micro flow path.

11. The gas-generating material according to claim 1, wherein the alkoxysilane coupling agent having an amino group is at least one selected from the group consisting of N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N,N'-bis[(3-trimethoxysilyl)propyl]ethylenediamine, 3-aminopropyltrimethoxysilane, 3-aminopropyltriethoxysilane and N-phenyl-3-aminopropyltrimethoxysilane.

12. The gas-generating material according to claim 1, wherein the gas-generating material is a film.

13. The gas-generating material, according to claim 1, further comprising a tackifier having a Hazen color number of 200 or less and an SP value of 8.5 or more.

14. The gas-generating material according to claim 1, further comprising a cross-linking agent.

* * * * *